US011942033B2

(12) United States Patent
Zeng et al.

(10) Patent No.: US 11,942,033 B2
(45) Date of Patent: Mar. 26, 2024

(54) DRIVING CIRCUIT AND DISPLAY PANEL

(71) Applicant: Wuhan China Star Optoelectronics Semiconductor Display Technology Co., Ltd., Hubei (CN)

(72) Inventors: Mian Zeng, Hubei (CN); Liang Sun, Hubei (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 0 days.

(21) Appl. No.: 17/606,795

(22) PCT Filed: Jun. 29, 2021

(86) PCT No.: PCT/CN2021/103153
§ 371 (c)(1),
(2) Date: Oct. 27, 2021

(87) PCT Pub. No.: WO2022/252321
PCT Pub. Date: Dec. 8, 2022

(65) Prior Publication Data

US 2024/0021154 A1 Jan. 18, 2024

(30) Foreign Application Priority Data

Jun. 3, 2021 (CN) ......................... 202110618746.9

(51) Int. Cl.
*G09G 3/3233* (2016.01)

(52) U.S. Cl.
CPC ... *G09G 3/3233* (2013.01); *G09G 2300/0852* (2013.01); *G09G 2310/08* (2013.01); *G09G 2320/0233* (2013.01)

(58) Field of Classification Search
CPC ......... G09G 3/3233; G09G 2300/0852; G09G 2310/08; G09G 2320/0233; G09G 3/3225; G09G 3/3258; H01L 27/1251
See application file for complete search history.

(56) References Cited

U.S. PATENT DOCUMENTS

| | | | | |
|---|---|---|---|---|
| 11,011,113 | B1 | 5/2021 | Lu et al. | |
| 2018/0130410 | A1* | 5/2018 | Gao | G09G 3/3225 |
| 2018/0130420 | A1* | 5/2018 | Gao | G09G 3/3258 |
| 2018/0130424 | A1* | 5/2018 | Gao | H01L 27/1251 |
| 2022/0139307 | A1* | 5/2022 | Zhang | G09G 3/3233 345/204 |

FOREIGN PATENT DOCUMENTS

| | | |
|---|---|---|
| CN | 106409225 | 2/2017 |
| CN | 106504701 | 3/2017 |
| CN | 107103878 | 8/2017 |

(Continued)

*Primary Examiner* — Richard J Hong

(57) ABSTRACT

A driving circuit and a display panel are provided. The driving circuit includes a driving module and an additional module. The driving module includes a first transistor electrically connected to a first signal line and a connection transistor connected to a gate of the first transistor. The connection transistor has a connection node. The additional module includes a second transistor having the same threshold voltage as the first transistor, and the second transistor is connected between the connection node and the first signal line.

20 Claims, 8 Drawing Sheets

(56) References Cited

FOREIGN PATENT DOCUMENTS

| | | |
|---|---|---|
| CN | 107680533 | 2/2018 |
| CN | 207818163 | 9/2018 |
| CN | 109903724 | 6/2019 |
| CN | 110085170 | 8/2019 |
| CN | 110880293 | 3/2020 |
| CN | 111613177 | 9/2020 |
| CN | 111696486 | 9/2020 |
| CN | 111816119 | 10/2020 |
| CN | 111883044 | 11/2020 |
| CN | 112562588 | 3/2021 |

* cited by examiner

DRIVING CIRCUIT AND DISPLAY PANEL

RELATED APPLICATIONS

This application is a National Phase of PCT Patent Application No. PCT/CN2021/103153 having International filing date of Jun. 29, 2021, which claims the benefit of priority of Chinese Patent Application No. 202110618746.9 filed on Jun. 3, 2021. The contents of the above applications are all incorporated by reference as if fully set forth herein in their entirety.

FIELD AND BACKGROUND OF THE INVENTION

The present application relates to the field of display technologies, and more particularly to a driving circuit and a display panel.

Current display panels mostly use a 7T1C pixel driving circuit shown in FIG. 1A (a) in conjunction with a driving timing shown in FIG. 1B to drive a light-emitting device to emit light. However, in a light-emitting phase, there is a leakage current between a transistor T3 and a transistor T4, which affects stability of a gate voltage of the transistor T1 (that is, a potential at point B). As a result, brightness stability of the light-emitting device is affected, and a brightness of an image displayed by a display panel will decrease over time. Therefore, in order to reduce an influence of a leakage current on a display image, the transistor T3 and the transistor T4 adopt a double-gate design, as shown in (b) of FIG. 1A. However, in an actual panel production process, a parasitic capacitance will inevitably occur, causing a potential of point A1 between T3-1 and T3-2, and a potential of point A2 between T4-1 and T4-2 to change due to a coupling effect of the parasitic capacitance. Especially at a rising edge of a scan signal Scan, the potential at point A1 and the potential at point A2 will be different from the potential at point B due to coupling. When the light-emitting device emits light, an electric leakage of T3-1 and T4-1 will cause the potential of point B to fluctuate, which causes a light-emitting brightness of the light-emitting device to gradually decrease over time within one frame. In particular, in the case of low-frequency driving, due to a long time of one frame, a brightness change of the light-emitting device will be relatively large, resulting in a flicker issue.

SUMMARY OF THE INVENTION

The embodiments of the present application provide a driving circuit and a display panel, which can reduce an issue that a light-emitting brightness of a light-emitting device changes greatly with time due to a change of a potential at a connection node of a connection transistor.

An embodiment of the present application provides a driving circuit. The driving circuit includes a driving module and an additional module.

The driving module comprises a light-emitting device, a first transistor, and a connection transistor. The light-emitting device and the first transistor are connected in series between a first voltage terminal and a second voltage terminal, and one of a source and a drain of the first transistor is electrically connected to a first signal line; the connection transistor comprises a first sub-connection transistor and a second sub-connection transistor connected in series, the first sub-connection transistor and the second sub-connection transistor have a connection node, one of a source and a drain of the first sub-connection transistor is electrically connected to a gate of the first transistor, and a gate of the first sub-connection transistor and a gate of the second sub-connection transistor are electrically connected.

The additional module comprises a second transistor, one of a source and a drain of the second transistor is electrically connected to the first signal line, and the other of the source and the drain of the second transistor is electrically connected to the connection node and a gate of the second transistor, and a threshold voltage of the second transistor is the same as a threshold voltage of the first transistor.

The present application also provides a display panel including the above-mentioned driving circuit.

The present application also provides a display panel. The display panel includes a plurality of driving circuits arranged in an array and a plurality of additional circuits.

Each of the driving circuits comprises a driving module, the driving module comprises a light-emitting device, a first transistor, and a connection transistor, wherein the light-emitting device and the first transistor are connected in series between a first voltage terminal and a second voltage terminal, and one of a source and a drain of the first transistor is electrically connected to a first signal line; the connection transistor comprises a first sub-connection transistor and a second sub-connection transistor connected in series, the first sub-connection transistor and the second sub-connection transistor have a connection node, one of a source and a drain of the first sub-connection transistor is electrically connected to a gate of the first transistor, and a gate of the first sub-connection transistor and a gate of the second sub-connection transistor are electrically connected.

Each of the additional circuits is electrically connected to the plurality of drive circuits corresponding to a column, each of the additional circuits comprises a first additional module, a second additional module, and a signal module. The first additional module comprises a second odd-transistor, one of a source and a drain of the second odd-transistor is electrically connected to the connection node of the driving circuit in an odd row and a gate of the second odd-transistor, and a threshold voltage of the second odd-transistor is the same as a threshold voltage of the first transistor of the driving circuit in the odd row. The second additional module comprises a second even-transistor, one of a source and a drain of the second even-transistor is electrically connected to the connection node of the driving circuit in an even row and a gate of the second even-transistor, and a threshold voltage of the second even-transistor is the same as a threshold voltage of the first transistor of the driving circuit in the even row. The signal module comprises a fifth-odd-transistor and a fifth-even-transistor, a source and a drain of the fifth-odd-transistor are electrically between one of the source and the drain of the second odd-transistor and the first signal line, a source and a drain of the fifth even-transistor are electrically connected between one of the source and the drain of the second even-transistor and the first signal line, a gate of the fifth odd-transistor is electrically connected to a second signal line, and the gate of the fifth even-transistor is electrically connected to a third signal line.

Beneficial Effect:

In the driving circuit and the display panel provided by the embodiments of the present application, the driving circuit includes a driving module and an additional module. The driving module comprises a light-emitting device, a first transistor, and a connection transistor. The light-emitting device and the first transistor are connected in series between a first voltage terminal and a second voltage terminal, and one of a source and a drain of the first transistor is electrically connected to a first signal line; the connection transistor comprises a first sub-connection transistor and a second sub-connection transistor connected in series, the first sub-connection transistor and the second sub-connection transistor have a connection node, one of a source and a drain of the first sub-connection transistor is electrically connected to a gate of the first transistor, and a gate of the first sub-connection transistor and a gate of the second sub-connection transistor are electrically connected. The additional module comprises a second transistor, one of a source and a drain of the second transistor is electrically connected to the first signal line, and the other of the source and the drain of the second transistor is electrically connected to the connection node and a gate of the second transistor, and a threshold voltage of the second transistor is the same as a threshold voltage of the first transistor. By providing a second transistor having the same threshold voltage as the first transistor in the additional module, the first signal line and the second transistor are used to reduce a voltage between the connection node and the gate of the first transistor. In this way, a potential change amount at the connection node is reduced within one frame, and the issue that the light-emitting brightness of the light-emitting device changes greatly with time within one frame is thereby improved. It is beneficial to improve the issue that the display panel is prone to flicker when the display panel is driven at a low frequency.

DESCRIPTION OF SPECIFIC EMBODIMENTS OF THE INVENTION

Figure 1A:
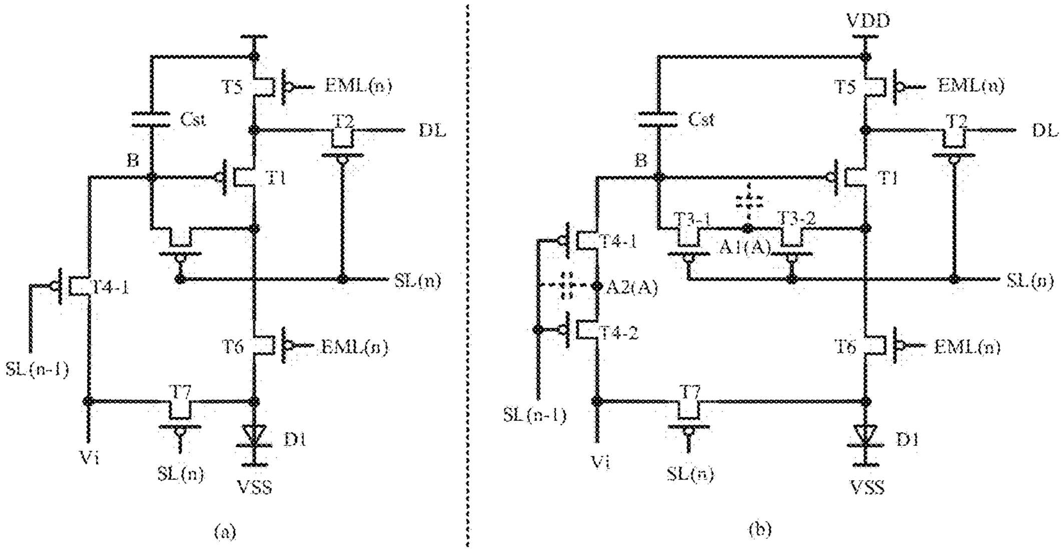
FIG. 1A and FIG. 1B are structural schematic diagrams and timing control diagrams of driving circuits in the prior art.

In order to make the purpose, technical solutions, and effects of this present application clearer, the following further describes this application in detail with reference to the accompanying drawings and examples. It should be understood that the specific embodiments described here are only used to explain the present application, and are not used to limit the present application.

Specifically, FIG. 2A to FIG. 2D are structural schematic diagrams of a driving circuit provided by an embodiment of the present application. The embodiment of the present application provides a driving circuit, which includes a driving module and an additional module.

The driving module includes a light-emitting device D1, a first transistor T1, and a connection transistor Tc. The first transistor T1 and the light-emitting device D1 are connected in series between a first voltage terminal VDD and a second voltage terminal VSS. The first transistor T1 is electrically connected to a first signal line DL. The first transistor T1 is used to generate a driving current for driving the light-emitting device D1 to emit light according to a data signal Vdata loaded in the first signal line DL, and to drive the light-emitting device D1 to emit light. The connection transistor Tc is electrically connected to a gate of the first transistor T1. Further, the connection transistor Tc includes a first sub-connection transistor Tc1 and a second sub-connection transistor Tc2 connected in series. The first sub-connection transistor Tc1 and the second sub-connection transistor Tc2 have a connection node A. One of a source and a drain of the first sub-connection transistor Tc1 is electrically connected to a gate of the first transistor T1. A gate of the first sub-connection transistor Tc1 and a gate of the second sub-connection transistor Tc2 are electrically connected.

Optionally, the light-emitting device D1 includes an organic light emitting diode, a sub-millimeter light emitting diode or a micro light emitting diode. Optionally, the driving circuit may be a pixel driving circuit or a backlight driving circuit. When the driving circuit is a pixel driving circuit, the light-emitting device D1 serves as a sub-pixel. When the driving circuit is a backlight driving circuit, the light-emitting device D1 serves as a backlight source.

It can be understood that, in the driving circuits shown in FIG. 2A to FIG. 2D, only one of the driving circuits including the light-emitting device D1 is taken as an example for description. In practical applications, a plurality of the light-emitting devices D1 may be included in one driving circuit. A plurality of the light-emitting devices D1 may be connected in series, or a plurality of the light-emitting devices D1 may be connected in parallel, so as to control light-emitting states of the plurality of light-emitting devices D1 at the same time.

The additional module includes a second transistor T2. The second transistor T2 is electrically connected to the first signal line DL and a connection node A. A threshold voltage of the second transistor T2 is the same as a threshold voltage of the first transistor T1. Specifically, one of a source and a drain of the second transistor T2 is electrically connected to the first signal line DL. The other of the source and drain of the second transistor T2 is electrically connected to the connection node A and a gate of the second transistor T2.

The additional module reduces a voltage between the connection node A and the gate of the first transistor T1 according to the data signal Vdata loaded in the first signal line DL and the threshold voltage of the second transistor T2. That is, a potential difference between the gate of the first transistor T1 and the connection node A is reduced. Therefore, a potential change amount at the connection node A is reduced within one frame time, and an issue that a light-emitting brightness of the light-emitting device D1 changes greatly with time within one frame time is thereby improved.

It is understandable that the first transistor T1 and the second transistor T2 can have the same preparation parameters to ensure that the second transistor T2 has the same threshold voltage as the first transistor T1. However, in practical applications, due to factors such as manufacturing processes, the threshold voltage of the second transistor T2 may be slightly different from the threshold voltage of the first transistor T1. Therefore, the threshold voltage of the second transistor T2 in the present application is the same as the threshold voltage of the first transistor T1 includes that: the threshold voltage of the second transistor T2 is the same as the threshold voltage of the first transistor due to factors such as manufacturing process. There may be a slight difference in the threshold voltage of T1.

Further, the driving module includes at least one connection transistor Tc. When the driving module includes one connection transistor Tc, the connection transistor Tc may be electrically connected between the gate of the first transistor T1 and one of the source and the drain of the first transistor Tc, or the connection transistor Tc can be electrically connected between the gate of the first transistor T1 and a third voltage terminal Vi. When the driving module includes two connection transistors Tc, the connection transistors Tc are electrically connected between the gate of the first transistor T1 and one of the source and the drain of the first transistor Tc and are electrically connected between the gate of the first transistor T1 and the third voltage terminal Vi, as shown in FIG. 2A to FIG. 2D.

Specifically, the connection transistor Tc includes a third transistor T3. The third transistor T3 includes a third sub-connection transistor Tc3 and a fourth sub-connection transistor Tc4 connected in series. The third sub-connection transistor Tc3 and the fourth sub-connection transistor Tc4 have a first sub-connection node A1. The first sub-connection transistor Tc1 includes the third sub-connection transistor Tc3, the second sub-connection transistor Tc2 includes the fourth sub-connection transistor Tc4, and the connection node A includes the first sub-connection node A1. A source and a drain of the third sub-connection transistor Tc3 are electrically connected between the first sub-connection node A1 and the gate of the first transistor T1, a source and a drain of the fourth sub-connection transistor Tc4 are connected between the first sub-connection node A1 and one of the source and the drain of the first transistor T1, the gate of the third sub-connection transistor Tc3 and the gate of the fourth sub-connection transistor Tc4 are electrically connected, and/or, the connection transistor Tc includes a fourth transistor T4, the fourth transistor T4 includes a fifth sub-connection transistor Tc5 and a sixth sub-connection transistor Tc6 connected in series, the fifth sub-connection transistor Tc5 and the sixth sub-connection transistor Tc6 have a second sub-connection node A2. The first sub-connection transistor Tc1 includes the fifth sub-connection transistor Tc5. The second sub-connection transistor Tc2 includes the sixth sub-connection transistor Tc6. The connection node A includes the second sub-connection node A2. A source and a drain of the fifth sub-connection transistor Tc5 are electrically connected between the second sub-connection node A2 and the gate of the first transistor T1. A source and a drain of the sixth sub-connection transistor Tc6 are electrically connected between the second sub-connection node A2 and the third voltage terminal Vi. A gate of the fifth sub-connection transistor Tc5 and a gate of the sixth sub-connection transistor Tc6 are electrically connected. The driving module can reset a gate potential of the first transistor T1 by signals loaded from the fourth transistor T4 and the third voltage terminal Vi.

Optionally, both the gate of the third transistor T3 and the gate of the fourth transistor T4 are electrically connected to a scan line. Specifically, the gate of the third transistor T3 is electrically connected to a nth scan line SL(n) that transmits a nth level scan signal Scan(n). The gate of the fourth transistor T4 is electrically connected to a n−1th scan line SL(n−1) that transmits the n−1th level scan signal Scan(n−1), where n≥1.

Optionally, an active layer of the third transistor T3 and an active layer of the fourth transistor T4 both include inorganic semiconductor materials. Further, the active layer of the third transistor T3 and the active layer of the fourth transistor T4 both include silicon semiconductor material.

Further, please continue to refer to FIG. 2A to FIG. 2D, the additional module further includes a fifth transistor T5. A source and a drain of the fifth transistor T5 are electrically connected between the first signal line DL and the second transistor T2. The fifth transistor T5 is used to transmit the data signal Vdata loaded in the first signal line DL to the second transistor T2. Specifically, one of the source and the drain of the fifth transistor T5 is electrically connected to one of the source and the drain of the second transistor T2. The other of the source and the drain of the fifth transistor T5 is electrically connected to the first signal line DL.

Further, the additional module further includes a first capacitor C1. The first capacitor C1 is electrically connected between the first voltage terminal VDD, the gate of the second transistor T2, and one of the source and the drain of the second transistor T2, and electrically connected between the first voltage terminal VDD and the connection node A. Specifically, a first end of the first capacitor C1 is electrically connected to the first voltage terminal VDD. A second end of the first capacitor C1, one of the source and the drain of the second transistor T2 connected to the gate of the second transistor T2, and the connection node A are electrically connected.

Figure 2A:
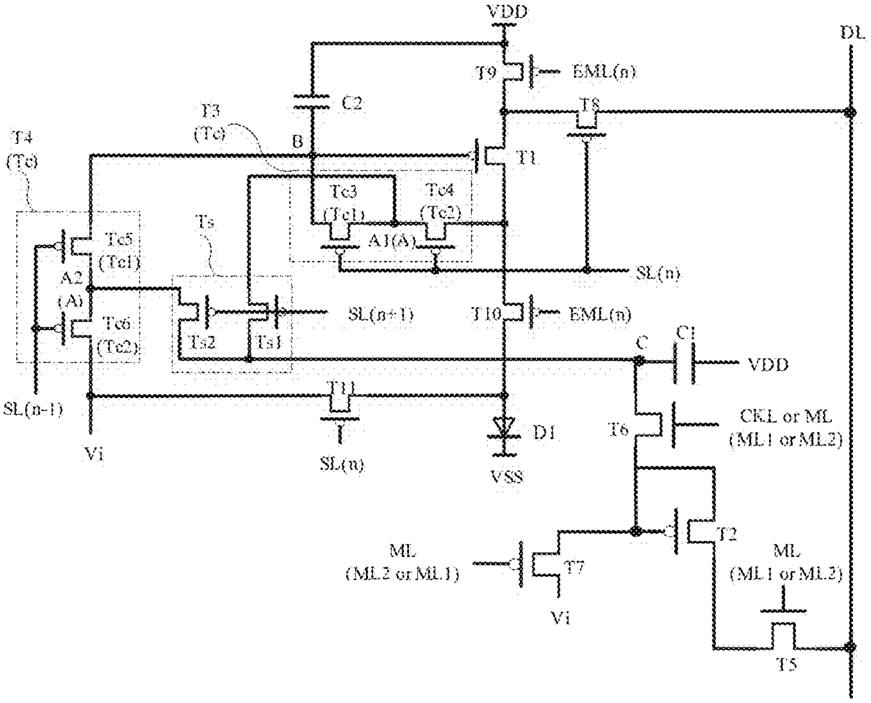
FIG. 2A to FIG. 2D are schematic structural diagrams of driving circuits provided by embodiments of the present application.
Figure 2B:
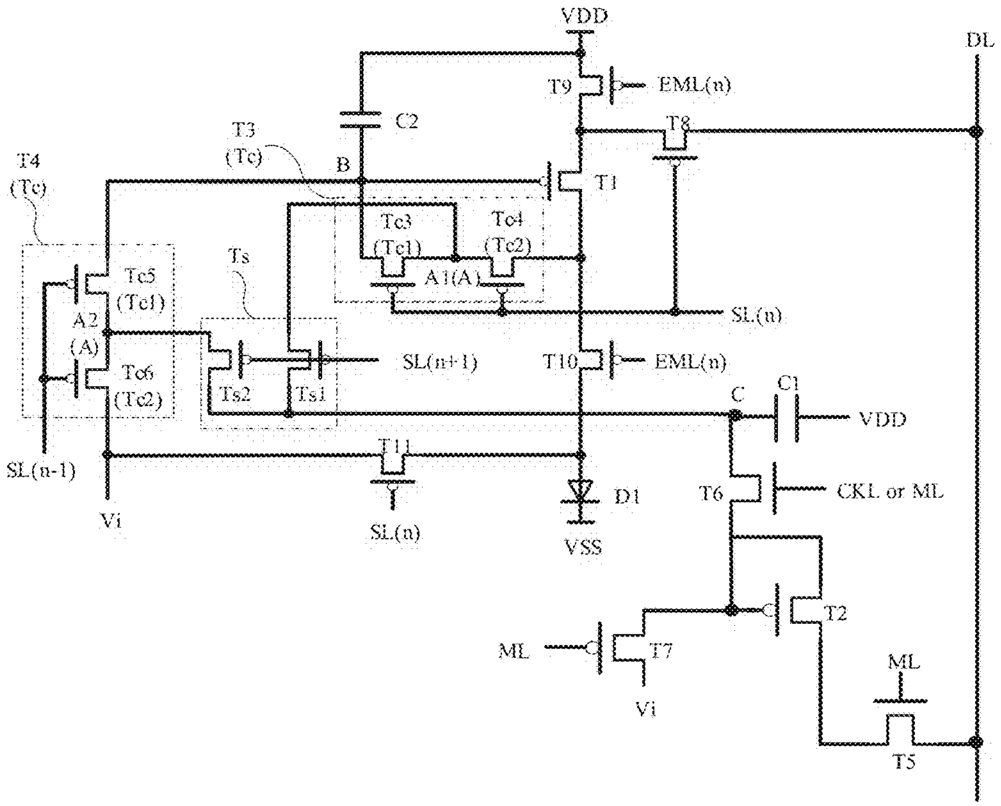
Figure 2C:
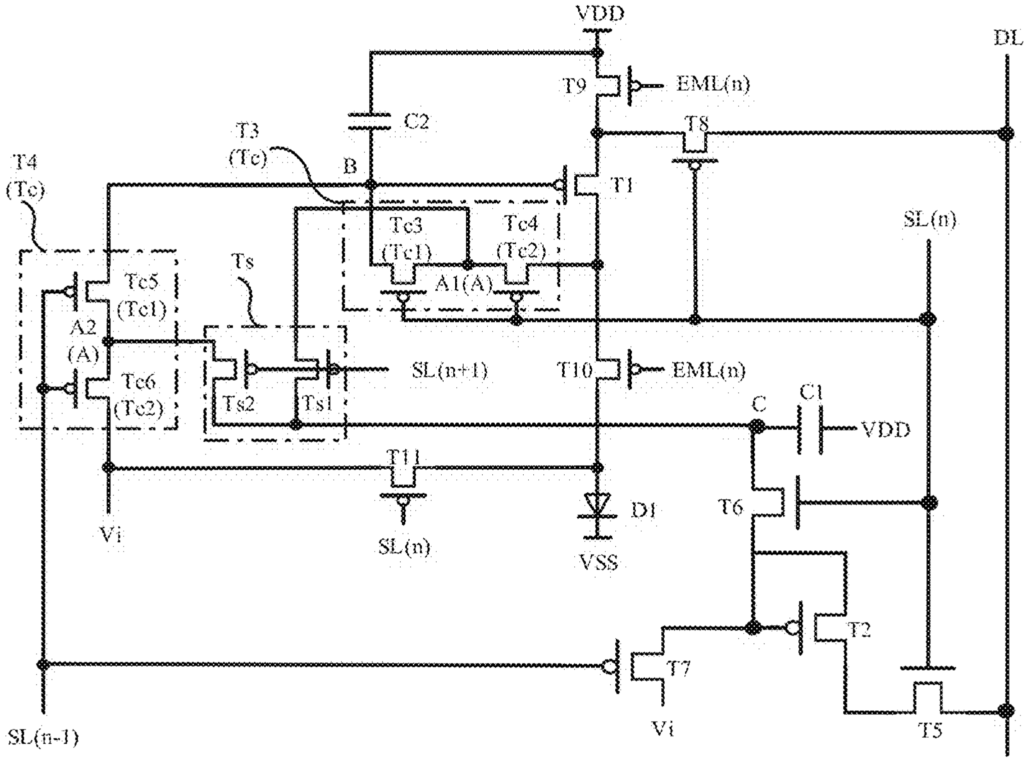

Further, please continue to refer to FIG. 2A to FIG. 2C, the additional module further includes a sixth transistor T6. A source and a drain of the sixth transistor T6 are electrically connected between the first capacitor C1 and the second transistor T2. The sixth transistor T6 is used to disconnect an electrical connection between the second transistor T2 and the first capacitor C1, or to electrically connect the second transistor T2 and the first capacitor C1. Specifically, one of the source and the drain of the sixth transistor T6 is electrically connected to the second end of the first capacitor C1. The other of the source and the drain of the sixth transistor T6 is electrically connected to one of the source and the drain of the second transistor T2 connected to the gate of the second transistor T2.

Further, please continue to refer to FIG. 2A to FIG. 2D, the additional module further includes a seventh transistor T7. A source and a drain of the seventh transistor T7 are electrically connected between the gate of the second transistor T2 and the third voltage terminal Vi. The gate potential of the second transistor T2 is reset through the seventh transistor T7 and the third voltage terminal Vi.

Optionally, the gate of the fifth transistor T5 and the gate of the seventh transistor T7 may be electrically connected to a multiplexed signal line ML that transmits different multiplexed signals MUX, as shown in FIG. 2A. Specifically, the multiplexed signal line ML includes a first multiplexed signal line ML1 and a second multiplexed signal line ML2. The first multiplexed signal MUX1 loaded on the first multiplexed signal line ML1 is inverted from the second multiplexed signal MUX2 loaded on the second multiplexed signal line ML2. One of the first multiplexed signal line ML1 and the second reset signal line ML2 is electrically connected to the gate of the fifth transistor T5. The other of the first multiplexed signal line ML1 and the second multiplexed signal line ML2 is electrically connected to the gate of the seventh transistor T7.

Optionally, the gate of the fifth transistor T5 and the gate of the seventh transistor T7 may be electrically connected to the same multiplexed signal line ML, as shown in FIG. 2B. To ensure that the fifth transistor T5 and the seventh transistor T7 are not turned on at the same time, the fifth transistor T5 and the seventh transistor T7 are of different types. Specifically, the gate of the fifth transistor T5 and the gate of the seventh transistor T7 are both electrically connected to the same multiplexed signal line ML. The fifth transistor T5 is one of a P-type transistor and an N-type transistor. The seventh transistor T7 is the other of a P-type transistor and an N-type transistor.

Figure 2D:
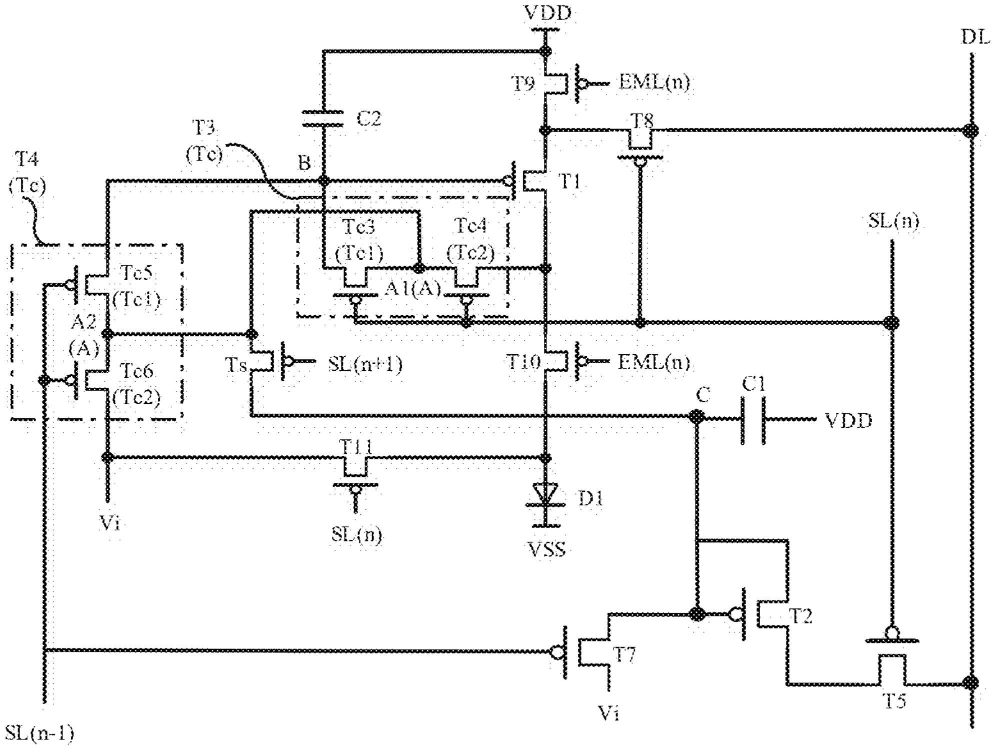

Optionally, the gate of the fifth transistor T5 and the gate of the seventh transistor T7 may be electrically connected to scan lines SL that transmit different scan signals, as shown in FIG. 2C to FIG. 2D. Specifically, the gate of the fifth transistor T5 is electrically connected to the nth scan line SL(n) that transmits the nth level scan signal Scan(n). The gate of the seventh transistor T7 is electrically connected to the n−1th scan line SL(n−1) that transmits the n−1th level scan signal Scan(n−1).

Optionally, the gate of the sixth transistor T6 may be electrically connected to a clock signal line CKL for transmitting a clock signal, as shown in FIG. 2A and FIG. 2B. Optionally, the gate of the sixth transistor T6 is electrically connected to the nth scan line SL(n) for transmitting the nth level scan signal Scan(n), as shown in FIG. 2C. When the gate of the fifth transistor T5 and the gate of the seventh transistor T7 are electrically connected to the scan line SL that transmits different scan signals, the sixth transistor T6 can be omitted, as shown in FIG. 2D.

In the driving circuit shown in FIG. 2A to FIG. 2C, the fifth transistor T5 and the sixth transistor T6 are of the same type. That is, the fifth transistor T5 and the sixth transistor T6 are both P-type transistors or N-type transistors. Further, in the driving circuit shown in FIG. 2A and FIG. 2B, the clock signal loaded by the clock signal line CKL to which the gate of the sixth transistor T6 is electrically connected is the same phase as the multiplexed signal MUX loaded in the multiplexed signal line ML electrically connected to the gate of the fifth transistor T5. This turns on the fifth transistor T5 and the sixth transistor T6 at the same time. Thus, the data signal Vdata is transmitted to the second end of the first capacitor C1 through the sixth transistor T6. Similarly, in the driving circuit shown in FIG. 2C, the fifth transistor T5 and the sixth transistor T6 are simultaneously turned on in response to the n-th stage scan signal Scan(n). In addition, in the driving circuit shown in FIG. 2A and FIG. 2B, the gate of the sixth transistor T6 and the gate of the fifth transistor T5 may be electrically connected to the multiplexed signal line ML that transmits the same multiplexed signal, in order to reduce the number of control signals used by the driving circuit.

Please continue to refer to FIG. 2A to FIG. 2D, in order to prevent the voltage stored on the first capacitor C1 from causing incorrect compensation to the connection node A when the connection node A does not need to compensate for the change in the connection node A, the driving circuit also includes a switching module. The switching module includes a switching transistor Ts. The switching transistor Ts is used to disconnect the electrical connection between the connection node A and the additional module, or to realize the electrical connection between the connection node A and the additional module. Optionally, the gate of the switching transistor Ts is electrically connected to the n+1th scan line SL(n+1) that transmits the n+1th level scan signal Scan(n+1).

When the driving module includes a connection transistor Tc, the switching module may include a switching transistor Ts. One of the source and the drain of the switching transistor Ts is electrically connected to the connection node A. The other of the source and the drain of the switching transistor Ts is electrically connected to the second end of the first capacitor C1. When the driving module includes two connection transistors Tc, the switching module may include one switching transistor Ts, as shown in FIG. 2D, or two switching transistors Ts, as shown in FIG. 2A to FIG. 2C.

Specifically, please continue to refer to FIG. 2A to FIG. 2C, the switching transistor Ts includes a first sub-switching transistor Ts1 and a second sub-switching transistor Ts2. One of the source and the drain of the first sub-switching transistor Ts1 is electrically connected to the first sub-connection node A1. The other of the source and the drain of the first sub-switching transistor Ts1 is electrically connected to the second end of the first capacitor C1. One of the source and the drain of the second sub-switching transistor Ts2 is electrically connected to the second sub-connection node A2. The other of the source and the drain of the second sub-switching transistor Ts2 is electrically connected to the second end of the first capacitor C1.

Specifically, please continue to refer to FIG. 2D, one of the source and the drain of the switching transistor Ts is electrically connected to the first sub-connection node A1 and the second sub-connection node A2. The other of the source and the drain of the switching transistor Ts is electrically connected to the second end of the first capacitor C1. Compared with the driving circuit shown in FIG. 2A to FIG. 2C, the driving circuit shown in FIG. 2D has a smaller number of transistors, which is beneficial to reduce control difficulty and wiring design complexity, and save wiring space.

Since the sixth transistor T6 is electrically connected between the second end of the first capacitor C1 and one of the source and the drain of the second transistor T2 connected to the gate of the second transistor T2. Therefore, the electrical connection between the switching transistor Ts and the second end of the first capacitor C1 is that the switching transistor Ts is electrically connected to one of the source and the drain of the sixth transistor T6 connected to the second end of the first capacitor C1. The sixth transistor T6 can realize the electrical connection between the switching transistor Ts and the second transistor T2.

Please continue to refer to FIG. 2A to FIG. 2D, the driving module further includes an eighth transistor T8, a ninth transistor T9, a tenth transistor T10, an eleventh transistor T11, and a second capacitor C2.

The source and the drain of the eighth transistor T8 are electrically connected between the first signal line DL and the first transistor T1. This can transmit the data signal Vdata loaded by the first signal line DL to the first transistor T1. Specifically, one of the source and the drain of the eighth transistor T8 is electrically connected to one of the source and the drain of the first transistor T1. One of the source and the drain of the eighth transistor T8 is electrically connected to the first signal line DL. The gate of the eighth transistor T8 is electrically connected to the nth scan line SL(n) that transmits the nth level scan signal Scan(n).

The source and the drain of the ninth transistor T9 are electrically connected between the first voltage terminal VDD and the first transistor T1. Specifically, one of the source and the drain of the ninth transistor T9 is electrically connected to one of the source and the drain of the first transistor T1. One of the source and the drain of the ninth transistor T9 is electrically connected to the first voltage terminal VDD. The gate of the ninth transistor T9 is electrically connected to an emission control signal line EML(n) that transmits an emission control signal EM(n).

The source and the drain of the tenth transistor T10 are electrically connected between the light-emitting device D1 and the first transistor T1. Specifically, one of the source and the drain of the tenth transistor T10 is electrically connected to the other of the source and the drain of the first transistor T1. One of the source and the drain of the tenth transistor T10 is electrically connected to an anode of the light-emitting device D1. The gate of the tenth transistor T10 is electrically connected to the emission control signal line EML(n) that transmits the emission control signal EM(n).

The second capacitor C2 is connected in series between the gate of the first transistor T1 and the first voltage terminal VDD.

A cathode of the light-emitting device D1 is electrically connected to the second voltage terminal VSS.

Figure 3A:
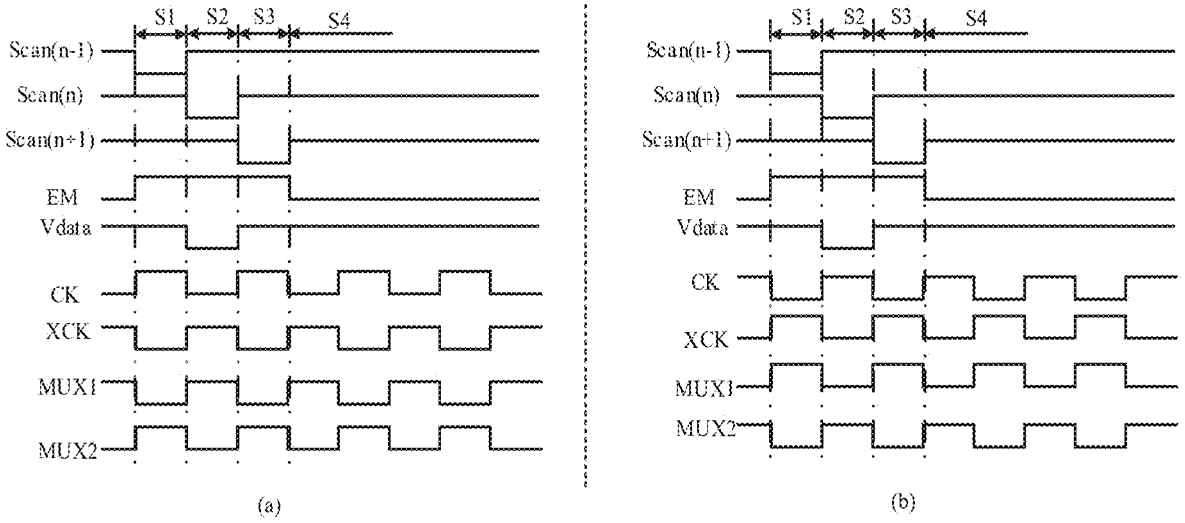
FIG. 3A to FIG. 3C are timing diagrams provided by embodiments of the present application.
Figure 3B:
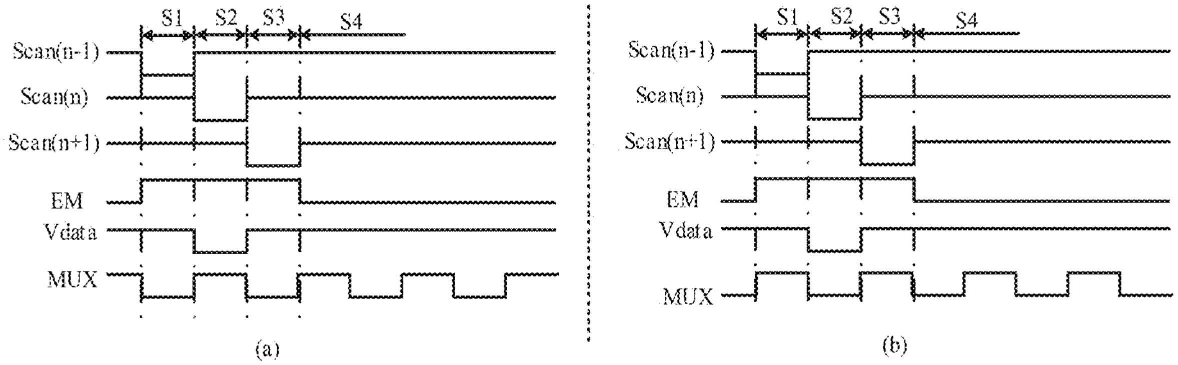
Figure 3C:
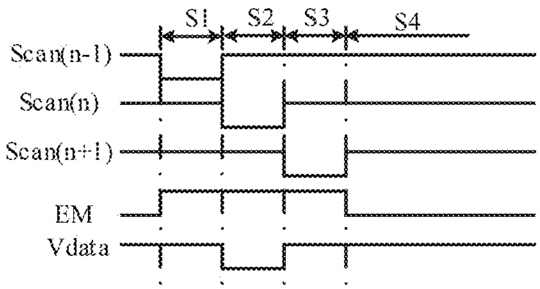

Please continue to refer to FIG. 3A to FIG. 3C for timing diagrams provided by embodiments of the present application. FIG. 3A is a timing diagram corresponding to the driving circuit shown in FIG. 2A. FIG. 3B is a timing diagram corresponding to the driving circuit shown in FIG. 2B. FIG. 3C is a timing diagram corresponding to the driving circuit shown in FIG. 2C to FIG. 2D. The first transistor T1, the third transistor T3, the fourth transistor T4, the eighth transistor T8, the ninth transistor T9, the tenth transistor T10, and the eleventh transistor T11 included in the driving module are all P-type transistors. The second transistor T2, the fifth transistor T5, the sixth transistor T6, and the seventh transistor T7 included in the additional module are all P-type transistors. The working principle of the driving circuit shown in FIG. 2A and FIG. 2C to FIG. 2D will be described in conjunction with the timing diagrams shown in FIG. 3A and FIG. 3C.

Specifically, please continue to refer to FIG. 2A and FIG. 3A (a), if the gate of the fifth transistor T5 is electrically connected to the second multiplexed signal line ML2, the gate of the seventh transistor T7 is electrically connected to the multiplexed signal line ML1, and the clock signal line CKL connected to the gate of the sixth transistor T6 loads the first clock signal CK.

Reset stage S1: when the n−1th level scan signal Scan (n−1) loaded on the n−1th scan line SL(n−1) and the first multiplexed signal MUX1 loaded on the first multiplexed signal line ML1 are at a low level, the second multiplexed signal MUX2 loaded on the second multiplexed signal line ML2 and the first clock signal CK loaded on the clock signal line CKL are at a high level. The fourth transistor T4 is turned on in response to the n−1th stage scan signal Scan (n−1), this makes the gate potential of the first transistor T1 reset through the third voltage terminal Vi. The seventh transistor T7 is turned on in response to the first multiplexing signal MUX1, this makes the gate potential of the second transistor T2 reset through the third voltage terminal Vi.

Data writing stage S2: the nth level scan signal Scan(n) loaded on the nth scan line SL(n), the second multiplexed signal MUX2 loaded on the second multiplexed signal line ML2, and the first clock signal CK loaded on the clock signal line CKL are at a low level. The first multiplexed signal MUX1 loaded on the first multiplexed signal line ML1 is at a high level. The third transistor T3, the eighth transistor T8, and the eleventh transistor T11 are turned on in response to the n-th stage scan signal Scan(n). The data signal Vdata loaded by the first signal line DL is transmitted to the gate of the first transistor T1 (i.e., point B) through the eighth transistor T8, the first transistor T1, and the third transistor T3. The second capacitor C2 maintains the gate potential of the first transistor T1 at Vdata-Vth1. The eleventh transistor T11 is turned on so that the anode potential of the light-emitting device D1 is reset through the third voltage terminal Vi. The fifth transistor T5 is turned on in response to the second multiplexed signal MUX2. The sixth transistor T6 is turned on in response to the first clock signal CK. The data signal Vdata loaded on the first signal line DL is transmitted to the second end of the first capacitor C1 through the fifth transistor T5, the second transistor T2, and the sixth transistor T6 (i.e., point C). The first capacitor C1 maintains the potential at point C at Vdata-Vth2. Vth1 represents the threshold voltage of the first transistor T1, and Vth2 represents the threshold voltage of the second transistor T2.

Maintaining stage S3: the n+1th level scan signal Scan (n+1) loaded on the n+1th scan line SL(n+1) and the first multiplexed signal MUX1 loaded on the first multiplexed signal line ML1 are at a low level. The second multiplexed signal MUX2 loaded on the second multiplexed signal line ML2 and the first clock signal CK loaded on the clock signal line CKL are at a high level. The switching transistor Ts is turned on in response to the n+1th stage scan signal Scan (n+1). The potential of the first sub-connection node A1 becomes Vdata-Vth2. The potential of the second sub-connection node A2 becomes Vdata-Vth2. The seventh transistor T7 is turned on in response to the first multiplexed signal MUX1, so that the gate of the second transistor T2 is reset through the third voltage terminal Vi.

Light emitting stage S4: The light emitting control signal EM loaded in the light emitting control signal line EML is at a low level. The ninth transistor T9 and the tenth transistor T10 are turned on in response to the light emission control signal. The first transistor T1 generates a driving current to drive the light emitting device D1 to emit light. In the light emitting stage S4, even the first clock signal CK, the first multiplexed signal MUX1, and the second multiplexed signal MUX2 continuously jump between a high level and a low level, respectively, the switching transistor Ts that responds to the scan signal Scan(n+1) of the n+1th stage is always kept in an off state. Therefore, the additional module does not affect the light emitting state of the light-emitting device D1.

Similarly, the gate of the fifth transistor T5 is electrically connected to the first multiplexed signal line ML1. The gate of the seventh transistor T7 is electrically connected to the second multiplexed signal line ML2. Then, the clock signal line CKL electrically connected to the gate of the sixth transistor T6 loads the second clock signal XCK. The first clock signal CK is inverted from the second clock signal XCK. The first clock signal CK is the same phase as the second multiplexed signal MUX2. Then, the working principle of the driving circuit can be obtained through (b) in FIG. 3A, which will not be repeated here.

Specifically, please continue to refer to FIGS. 2C to 2D and 3C. The working principle of the driving circuit still includes a reset phase S1, a data writing phase S2, a maintaining phase S3, and a light emitting phase S4.

Reset stage S1: the n−1th stage scan signal Scan(n−1) is at low level, and the fourth transistor T4 and the seventh transistor T7 are turned on in response to the n−1th stage scan signal Scan(n−1). The third voltage terminal Vi resets the gate potential of the first transistor T1 and the gate potential of the second transistor T2.

Data writing stage S2: the scan signal Scan(n) of the nth stage is at a low level. The fifth transistor T5, the third transistor T3, the eighth transistor T8, and the eleventh transistor T11 are turned on in response to the n-th stage scan signal Scan(n). In the driving circuit shown in FIG. 2C, the sixth transistor T6 is also turned on in response to the scan signal Scan(n) of the nth stage. The data signal Vdata is transmitted to the gate of the first transistor T1 (that is, at point B) through the eighth transistor T8, the first transistor T1, and the third transistor T3. The second capacitor C2 maintains the gate potential of the first transistor T1 at Vdata-Vth1. The eleventh transistor T11 is turned on so that the anode potential of the light-emitting device D1 is reset through the third voltage terminal Vi. In the driving circuit shown in FIG. 2C, the fifth transistor T5 and the sixth transistor T6 are turned on. The data signal Vdata is transmitted to the second end (i.e., at point C) of the first capacitor C1 through the fifth transistor T5, the second transistor T2, and the sixth transistor T6. The first capacitor C1 maintains the potential at point C at Vdata-Vth2. In the driving circuit shown in FIG. 2D, the fifth transistor T5 is turned on. The data signal Vdata is transmitted to the second end (i.e., at point C) of the first capacitor C1 through the fifth transistor T5 and the second transistor T2. The first capacitor C1 maintains the potential at point C at Vdata-Vth2.

Maintaining stage S3: the scan signal Scan(n+1) of the n+1th stage is at a low level. The switching transistor Ts is turned on in response to the n+1th stage scan signal Scan (n+1). The potential of the first sub-connection node A1 becomes Vdata-Vth2. The potential of the second sub-connection node A2 becomes Vdata-Vth2.

Light emitting stage S4: The light emitting control signal EM is at a low level. The ninth transistor T9 and the tenth transistor T10 are turned on in response to the emission control signal EM. The first transistor T1 generates a driving current to drive the light-emitting device D1 to emit light.

Specifically, please continue to refer to (a) in FIG. 2B and FIG. 3B, the first transistor T1, the third transistor T3, the fourth transistor T4, the eighth transistor T8, the ninth transistor T9, the tenth transistor T10, and the eleventh transistor T11 included in the driving module are all P-type transistors. The second transistor T2 and the seventh transistor T7 included in the additional module are P-type transistors. The fifth transistor T5 and the sixth transistor T6 are N-type transistors. The gate of the fifth transistor T5, the gate of the sixth transistor T6, and the gate of the seventh transistor T7 are all electrically connected to the same multiplexed signal line ML. The working principle of the driving circuit shown in FIG. 2B will be described with reference to (a) in FIG. 3B.

Reset stage S1: When the scan signal Scan(n−1) of the n−1th level is at a low level, the multiplexed signal MUX loaded in the multiplexed signal line ML is at the low level. The fourth transistor T4 is turned on in response to the n−1th stage scan signal Scan(n−1). The third voltage terminal Vi resets the gate potential of the first transistor T1. The seventh transistor T7 is turned on in response to the multiplexed signal MUX. The third voltage terminal Vi resets the gate potential of the second transistor T2.

Data writing stage S2: the nth stage scan signal Scan(n) and the multiplexed signal MUX are at a high level. The third transistor T3, the eighth transistor T8, and the eleventh transistor T11 are turned on in response to the n-th stage scan signal Scan(n). The data signal Vdata is transmitted to the gate of the first transistor T1 (that is, at point B) through the eighth transistor T8, the first transistor T1, and the third transistor T3. The second capacitor C2 maintains the gate potential of the first transistor T1 at Vdata-Vth1. The eleventh transistor T11 is turned on so that the anode potential of the light-emitting device D1 is reset through the third voltage terminal Vi. The fifth transistor T5 and the sixth transistor T6 are turned on in response to the multiplexed signal MUX. The data signal Vdata is transmitted to the second end (i.e., at point C) of the first capacitor C1 through the fifth transistor T5, the second transistor T2, and the sixth transistor T6. The first capacitor C1 maintains the potential at point C at Vdata-Vth2.

Maintaining stage S3: the scan signal Scan(n+1) of the n+1th stage is at a low level. The multiplexed signal MUX is at the low level. The switching transistor Ts is turned on in response to the n+1th stage scan signal Scan(n+1). The potential of the first sub-connection node A1 becomes Vdata-Vth2. The potential of the second sub-connection node A2 becomes Vdata-Vth2. The seventh transistor T7 is turned on in response to the multiplexed signal MUX, so that the gate of the second transistor T2 is reset through the third voltage terminal Vi.

Light emitting stage S4: The light emitting control signal EM is at a low level. The ninth transistor T9 and the tenth transistor T10 are turned on in response to the light emission control signal. The first transistor T1 generates a driving current to drive the light emitting device D1 to emit light.

Similarly, the second transistor T2, the fifth transistor T5, and the sixth transistor T6 included in the additional module are P-type transistors. The seventh transistor T7 is an N-type transistor. The gate of the fifth transistor T5, the gate of the sixth transistor T6, and the gate of the seventh transistor T7 are all electrically connected to the same multiplexed signal line ML. Then, the working principle of the driving circuit can be obtained through (b) in FIG. 3B, which will not be repeated here.

In the driving circuit shown in FIG. 2B, the gate of the sixth transistor T6 is electrically connected to the clock signal line CKL. The clock signal loaded on the clock signal line is the same phase as the multiplexed signal MUX loaded on the multiplexed signal line ML. This enables the fifth transistor T5 and the sixth transistor T6 to be turned on at the same time, ensuring that the data signal Vdata transmitted by the first signal line DL is transmitted to point C.

By analyzing the working principle of the driving circuit shown in FIGS. 2A to 2D, it can be known that the threshold voltage Vth2 of the second transistor T2 is the same as the threshold voltage Vth1 of the first transistor T1. In the maintaining phase S3, the potential of the connection node A of the connection transistor Tc is set to Vdata-Vth2. This reduces the voltage between the connection node A of the connection transistor Tc and the gate of the first transistor T1. That is, the voltage between the source and the drain of the first sub-connection transistor Tc1 is reduced. According to the small voltage difference between the source and the drain of the transistor, the characteristic that the leakage current of the transistor is greatly reduced can be obtained. When the voltage difference between the source and drain of the first sub-connection transistor Tc1 decreases, the leakage current in the connection transistor Tc also decreases. Therefore, the issue that the light emitting brightness of the light-emitting device changes greatly with time can be improved in the light emitting stage S4.

Figure 4:
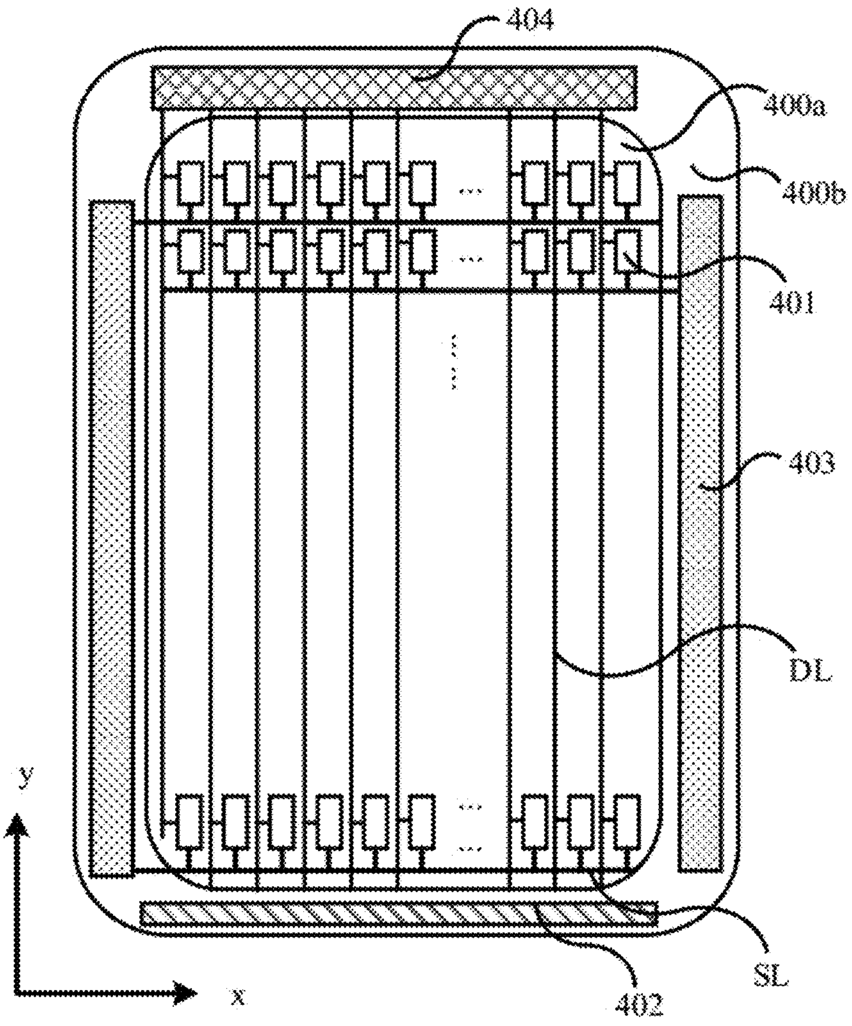
FIG. 4 is a structural schematic diagram of a display panel provided by an embodiment of the present application.

FIG. 4 is a structural schematic diagram of a display panel provided by an embodiment of the present application. The present application also provides a display panel, which includes any of the above-mentioned driving circuits. The driving circuit is a pixel driving circuit, and the light-emitting device D1 is used as a sub-pixel. Or the driving circuit is a backlight driving circuit, and the light-emitting device D1 is used as a backlight source.

For ease of description, the display panel is described by taking the driving circuit as a pixel driving circuit and the light emitting device D1 as a sub-pixel as an example. The driving circuit is a backlight driving circuit. When the light-emitting device D1 is used as a backlight source, the design of the display panel may refer to the driving circuit as a pixel driving circuit. The design of the display panel when the light-emitting device D1 is used as a sub-pixel is not repeated here.

Specifically, the display panel includes a display area 400*a* and a non-display area 400*b*. The display panel includes a plurality of sub-pixels 401 arranged in an array. A plurality of the sub-pixels 401 are located in the display area 400*a*. Each of the sub-pixels 401 is formed by a light-emitting device D1.

Correspondingly, the display panel includes a plurality of the driving circuits. In the driving circuit shown in FIGS. 2A to 2D, the driving module in the driving circuit uses the additional module to reduce the voltage between the connection node A and the gate of the first transistor T1. However, in practical applications, since one display panel includes a plurality of the driving circuits, the driving modules in the plurality of driving circuits can be multiplexed with one additional module, so as to reduce the voltage between the connection node A and the gate of the first transistor T1. That is, the number of the driving modules included in the display panel may be greater than or equal to the number of the additional modules included in the display panel. Each of the additional modules can be electrically connected to the connection node A of the connection transistor Tc in at least one of the driving modules.

Further, in the driving circuit shown in FIG. 2A and FIG. 2B, the additional module needs to use a multiplexed signal. The display panel further includes a multiplexer located in the non-display area 400*b*. The multiplexer is electrically connected to the multiple additional modules through multiple multiplexed signal lines ML.

Further, the gate of the fifth transistor T5 and the gate of the seventh transistor T7 are electrically connected to different multiplexed signal lines. The gate of the sixth transistor T6 is electrically connected to the clock signal line CKL. The display panel also includes a timing controller located in the non-display area 400*b*. The timing controller is electrically connected to a plurality of the additional modules through a plurality of the clock signal lines.

In the driving circuits shown in FIGS. 2A to 2B, the additional modules in the plurality of driving circuits are all electrically connected to the multiplexer and the timing controller. Therefore, the additional modules in the plurality of driving circuits may all be located in the non-display area 400*b*. Further, the additional modules in the plurality of driving circuits (i.e., 402 in FIG. 4 represents the additional modules in the plurality of driving circuits) may be located in a lower frame area of the display panel.

Further, the display panel further includes a gate driving chip 403 and a source driving chip 404 located in the non-display area 400*b*. The gate driving chip 403 is connected to a plurality of driving circuits through a plurality of scan lines SL. The source driving chip 404 is connected to a plurality of the driving circuits through a plurality of the first signal lines DL.

In the driving circuits shown in FIGS. 2C to 2D, the additional modules in the plurality of driving circuits are all electrically connected to the gate driving chip 403. Therefore, the additional modules in the plurality of driving circuits are all located in the display area 400*a*.

Optionally, the number of the driving circuits may be less than or equal to the number of the sub-pixels 401. Specifically, if each of the driving circuits includes one light-emitting device D1, the number of the driving circuits is equal to the number of the sub-pixels 401. If at least one of the driving circuits includes a plurality of the light-emitting devices D1, the number of the driving circuits is less than the number of the sub-pixels 401.

Optionally, a plurality of the driving circuits may be arranged in the same manner as a sampling of the sub-pixels 401, or may be arranged in a different arrangement from the sub-pixels 401 (As in some display panels, the display area 400*a* also includes a main display area, a light-transmitting area, and a transition area between the main display area and the light-transmitting area. The sub-pixels 401 located in the light-transmitting area and the transition area are arranged in an array. The first transistors T1 in the plurality of driving circuits are electrically connected to the plurality of sub-pixels 401 located in the light-transmitting area and the transition area, respectively. The connection transistor Tc, the eighth transistor T8, the ninth transistor T9, the tenth transistor T10, the eleventh transistor T11, the switching transistor Ts, and the second capacitor C2 are all located in the transition area. The main display area is an area mainly used for displaying images. The light-transmitting area can also transmit light while being used for displaying images, so that it is located in the area corresponding to the light-transmitting area. The sensor receives the light signal. The sensor includes a fingerprint sensor, a camera, etc.).

Correspondingly, the display panel includes a plurality of the first signal lines DL. The plurality of first signal lines DL are sequentially arranged along the first direction x. Each of the first signal lines DL extends along the second direction y. Each of the first signal lines DL is electrically connected to a plurality of the sub-pixels 401 located in the same column. Further, one of the additional modules can be electrically connected with at least one of the driving modules. The plurality of additional modules connected to an intermediate node Q of the connection transistor Tc in the driving module electrically connected to the plurality of sub-pixels 401 located in the same column and the same first signal line DL are electrically connected. This ensures that the plurality of driving modules and the corresponding additional modules that are electrically connected to the plurality of sub-pixels 401 located in the same column all use the same data signal Vdata. This ensures that the voltage between the connection node A of the connection transistor Tc and the gate of the first transistor T1 in each of the driving modules is effectively reduced.

Figure 5A:
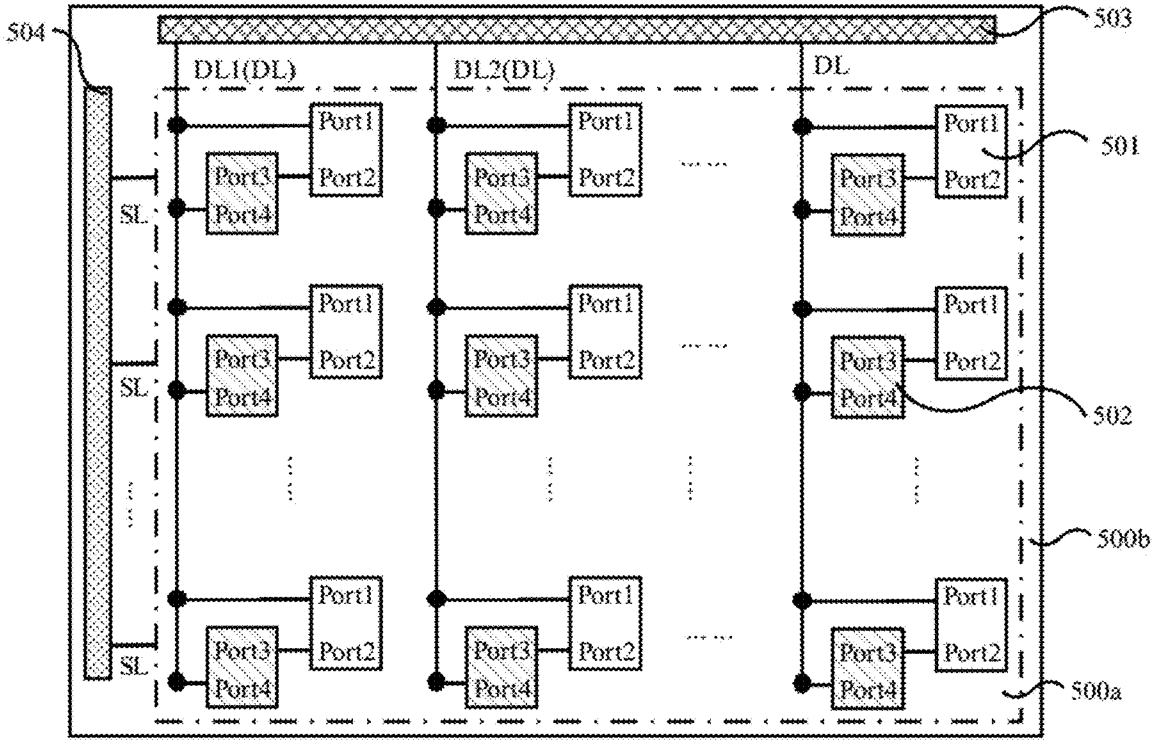
FIG. 5A and FIG. 5B are structural schematic diagrams of a display panel provided by an embodiment of the present application.
Figure 5B:
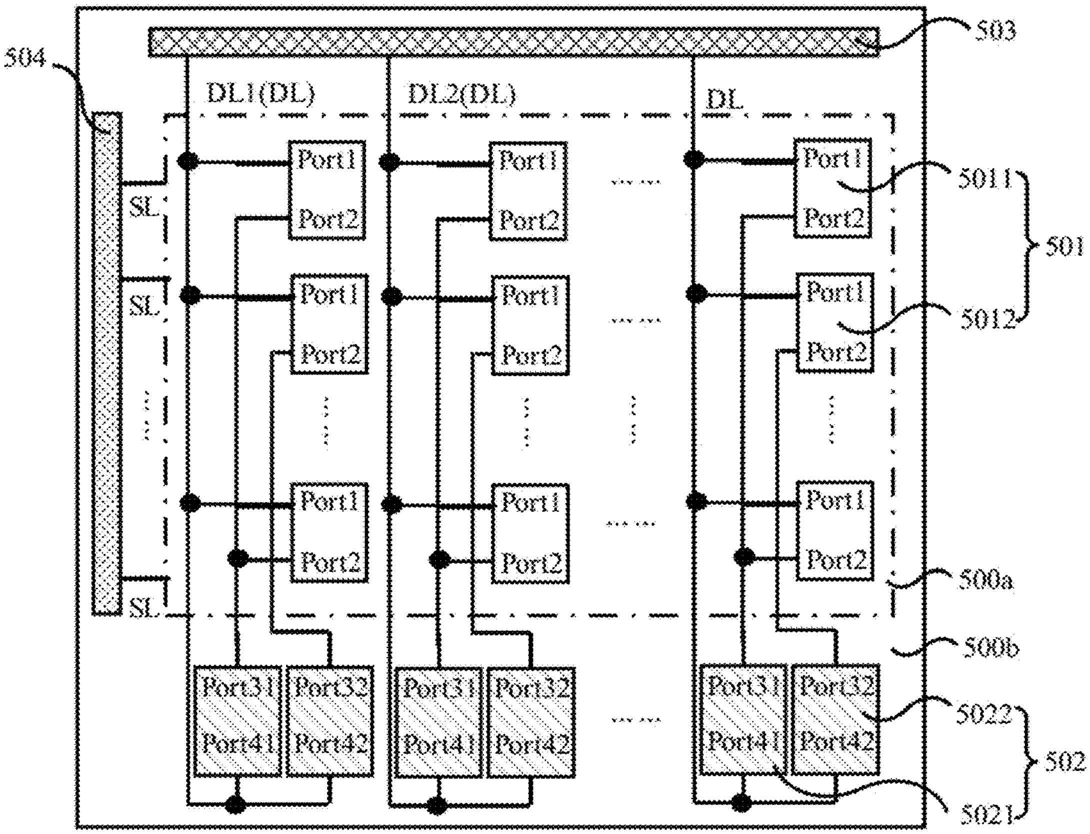
Figure 6A:
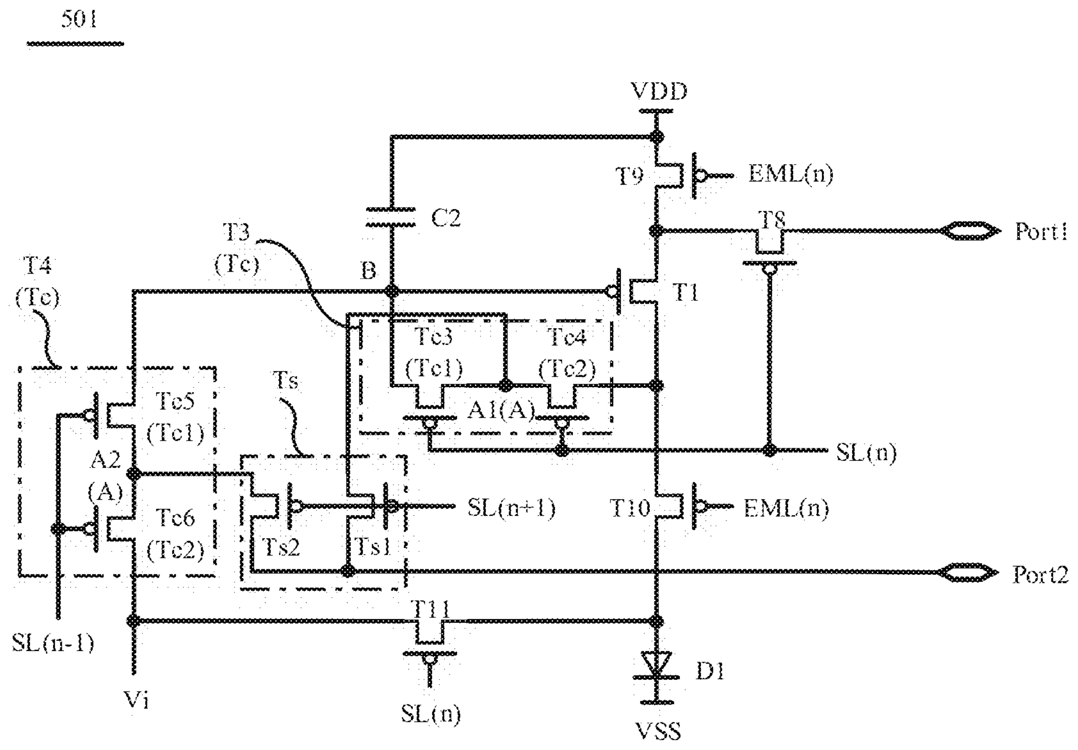
FIG. 6A is a structural schematic diagram of a driving circuit provided by an embodiment of the present application.
Figure 6B:
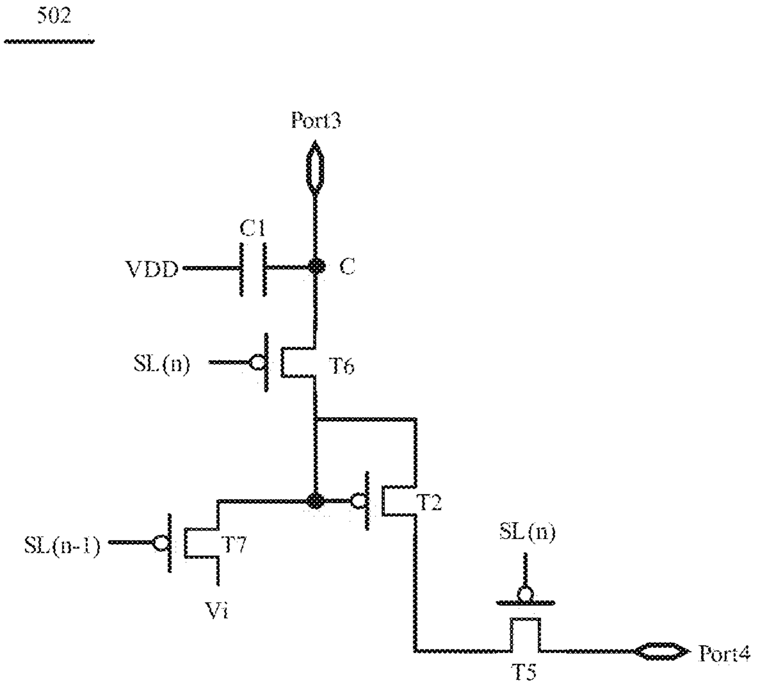
FIG. 6B and FIG. 6C are structural schematic diagrams of additional circuits provided by embodiments of the present application.
Figure 6C:
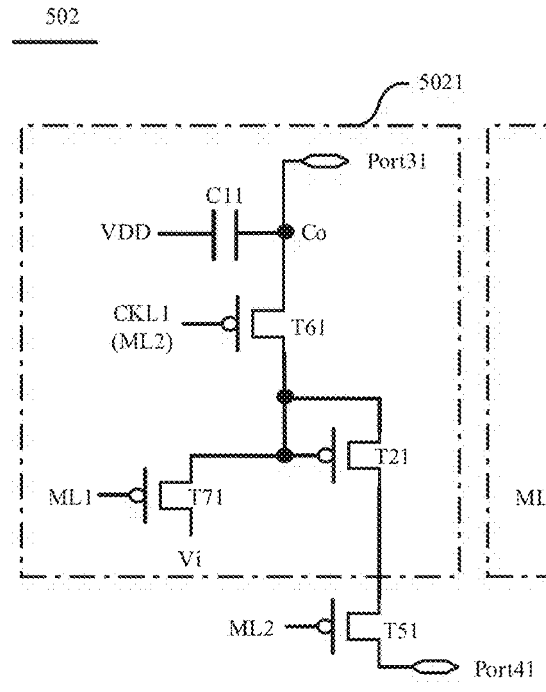

FIG. 5A to FIG. 5B are structural schematic diagrams of the display panel provided by the embodiment of the present application. FIG. 6A is a structural schematic diagram of a driving circuit provided by an embodiment of the present application. FIGS. 6B to 6C are structural schematic diagrams of the additional circuit provided by the embodiment of the present application. Port1 in FIGS. 5A to 5B and FIGS. 6A to 6B represents the connection end of the driving circuit 501 and the first signal line DL. Port2 and port3, port2 and port31, port2 and port32 represent the connection ends of the driving circuit 501 and the additional circuit 502. Port4, port41, and port42 indicate the connection ends of the additional circuit 502 and the first signal line DL.

This application provides a display panel. The display panel includes a plurality of driving circuits 501 arranged in an array, a plurality of additional circuits 502, a plurality of first signal lines DL, a source driving chip 503, and a gate driving chip 504.

Each of the first signal lines DL is electrically connected to a plurality of the driving circuits 501 located in the same column. Each of the first signal lines DL is electrically connected to at least one of the additional circuits 502. Each of the first signal lines DL is used to transmit a data signal Vdata.

The source driving chip 503 is located in the non-display area 500*b* of the display panel. The source driving chip 503 is electrically connected to the plurality of driving circuits 501 and the plurality of additional circuits 502 through a plurality of first signal lines DL.

The gate driving chip 504 is located in the non-display area 500*b* of the display panel, and the gate driving chip 504 is electrically connected to the plurality of driving circuits 501 through a plurality of scan lines SL.

Referring to FIG. 5A to FIG. 5B and FIG. 6A, a plurality of the driving circuits 501 are located in the display area 500*a* of the display panel. Each of the driving circuits 501 includes a light emitting device D1, a first transistor T1, and a connection transistor Tc. One of the source and the drain of the first transistor T1 is electrically connected to the corresponding first signal line DL. The light emitting device D1 and the first transistor T1 are connected in series between the first voltage terminal VDD and the second voltage terminal VSS. The connection transistor Tc is electrically connected to the gate of the first transistor T1. The connection transistor Tc includes a first sub-connection transistor Tc1 and a second sub-connection transistor Tc2 connected in series. The first sub-connection transistor Tc1 and the second sub-connection transistor Tc2 have a connection node A. One of the source and drain of the first sub-connection transistor Tc1 is electrically connected to the gate of the first transistor T1. The gate of the first sub-connection transistor Tc1 and the gate of the second sub-connection transistor Tc2 are electrically connected.

Please refer to FIGS. 5A and 6A to 6B, each of the additional circuits 502 includes a second transistor T2. The threshold voltage of the second transistor T2 and the corresponding first transistor T1 in the driving circuit 501 have the same threshold voltage. An additional circuit 502 is electrically connected to a driving circuit 501. The plurality of additional circuits 502 electrically connected to the plurality of driving circuits 501 located in the same column are electrically connected to the same first signal line DL. This enables the plurality of driving circuits 501 and the corresponding additional circuits 502 located in the same column to use the same data signal Vdata. This ensures that the voltage between the connection node A of the connection transistor Tc and the gate of the first transistor T1 in each driving circuit 501 is effectively reduced. Therefore, the issue that the light emitting brightness of the light-emitting device D1 changes greatly with time in one frame is improved. This helps to improve the issue that the display panel is prone to flicker when the display panel is driven at a low frequency.

Specifically, one of the source and the drain of the second transistor T2 in each additional circuit 502 is electrically connected to the corresponding first signal line DL. The other of the source and the drain of the second transistor T2 is electrically connected to the gate of the second transistor T2 and the corresponding connection node A in the driving circuit 501.

It can be understood that in the actual manufacturing process of the display panel, the first transistors T1 in the plurality of driving circuits 501 have the same manufacturing parameters and are prepared simultaneously. Therefore, the threshold voltages of the first transistors T1 in the plurality of driving circuits 501 are the same. In order to save the manufacturing process and ensure that the first transistor T1 in the plurality of driving circuits 501 and the second transistor T2 in the plurality of additional circuits 502 have the same threshold voltage, the second transistor T2 and the first transistor T1 have the same preparation parameters and are prepared simultaneously.

Please continue to refer to FIGS. 5A to 5B and 6A, each of the driving circuits 501 includes at least one of the connection transistors Tc.

Specifically, the connection transistor Tc includes a third transistor T3. The third transistor T3 is electrically connected between the gate of the first transistor T1 and one of the source and the drain of the first transistor T1; and/or, the connection transistor Tc includes a fourth transistor T4. The fourth transistor T4 is electrically connected between the gate of the first transistor T1 and the third voltage terminal.

Further, the third transistor T3 includes a third sub-connection transistor Tc3 and a fourth sub-connection transistor Tc4 connected in series. The third sub-connection transistor Tc3 and the fourth sub-connection transistor Tc4 have a first sub-connection node A1. The first sub-connection transistor Tc1 includes the third sub-connection transistor Tc3, the second sub-connection transistor Tc2 includes the fourth sub-connection transistor Tc4, and the connection node A includes the first sub-connection node A1. The source and the drain of the third sub-connection transistor Tc3 are electrically connected between the first sub-connection node A1 and the gate of the first transistor T1. The source and the drain of the fourth sub-connection transistor Tc4 are electrically connected between the first sub-connection node A1 and the other of the source and the drain of the first transistor T1. The gate of the third sub-connection transistor Tc3 and the gate of the fourth sub-connection transistor Tc4 are electrically connected.

The fourth transistor T4 includes a fifth sub-connection transistor Tc5 and a sixth sub-connection transistor Tc6 connected in series. The fifth sub-connection transistor Tc5 and the sixth sub-connection transistor Tc6 have a second sub-connection node A2. The first sub-connection transistor Tc1 includes the fifth sub-connection transistor Tc5. The second sub-connection transistor Tc2 includes the sixth sub-connection transistor Tc6. The connection node A includes the second sub-connection node A2. The source and the drain of the fifth sub-connection transistor Tc5 are electrically connected between the second sub-connection node A2 and the gate of the first transistor T1. The source and the drain of the sixth sub-connection transistor Tc6 are electrically connected between the second sub-connection node A2 and the third voltage terminal Vi. The gate of the fifth sub-connection transistor Tc5 and the gate of the sixth sub-connection transistor Tc6 are electrically connected. Optionally, the active layer of the third transistor T3 and the active layer of the fourth transistor T4 both include silicon semiconductor materials.

Further, each of the driving circuits 501 further includes an eighth transistor T8, a ninth transistor T9, a tenth transistor T10, an eleventh transistor T11, and a second capacitor C2.

One of the source and the drain of the eighth transistor T8 is electrically connected to one of the source and the drain of the first transistor T1. One of the source and the drain of the eighth transistor T8 is electrically connected to the corresponding first signal line DL. The gate of the eighth transistor T8 is electrically connected to the nth scan line SL(n) that transmits the nth level scan signal Scan(n).

One of the source and the drain of the ninth transistor T9 is electrically connected to one of the source and the drain of the first transistor T1. One of the source and the drain of the ninth transistor T9 is electrically connected to the first voltage terminal VDD. The gate of the ninth transistor T9 is electrically connected to the emission control signal line EML(n) that transmits the emission control signal EM(n).

One of the source and the drain of the tenth transistor T10 is electrically connected to the other of the source and the drain of the first transistor T1. One of the source and the drain of the tenth transistor T10 is electrically connected to the anode of the light-emitting device D1. The gate of the tenth transistor T10 is electrically connected to the emission control signal line EML(n) that transmits the emission control signal EM(n).

The second capacitor C2 is connected in series between the gate of the first transistor T1 and the first voltage terminal VDD.

The cathode of the light-emitting device D1 is electrically connected to the second voltage terminal VSS. Optionally, the light-emitting device D1 includes a sub-millimeter light emitting diode, a micro light emitting diode or an organic light emitting diode. The light-emitting device D1 may be used as a sub-pixel or a backlight source, and each of the driving circuits may include a plurality of the light-emitting devices D1.

Further, each of the driving circuits 501 further includes a switching module. The switching module includes a switching transistor Ts. Specifically, the connection transistor Tc includes the third transistor T3 and the fourth transistor T4, and the switching module includes a switching transistor Ts. One of the source and the drain of the switching transistor Ts is electrically connected to the first sub-connection node A1 and the second sub-connection node A2. The other of the source and the drain of the switching transistor Ts is electrically connected to the second end of the first capacitor C1 in the corresponding additional circuit 502. Or, the switching transistor Ts includes a first sub-switching transistor Ts1 and a second sub-switching transistor Ts2. One of the source and the drain of the first sub-switching transistor Ts1 is electrically connected to the first sub-connection node A1. The other of the source and the drain of the first sub-switching transistor Ts1 is electrically connected to the second end of the first capacitor C1 in the corresponding additional circuit 502. One of the source and the drain of the second sub-switching transistor Ts2 is electrically connected to the second sub-connection node A2. The other of the source and the drain of the second sub-switching transistor Ts2 is electrically connected to the second end of the first capacitor C1 in the corresponding additional circuit 502.

Please continue to refer to FIG. 6B, each of the additional circuits 502 further includes a signal module, and the signal module includes a fifth transistor T5. One of the source and the drain of the fifth transistor T5 is electrically connected to one of the source and the drain of the second transistor T2. The other of the source and the drain of the fifth transistor T5 is electrically connected to the corresponding first signal line DL.

Further, each of the additional circuits 502 further includes a seventh transistor T7 and a first capacitor C1. The first end of the first capacitor C1 is electrically connected to the first voltage terminal VDD. The second end of the first capacitor C1, one of the source and the drain of the second transistor T2 connected to the gate of the second transistor T2, and the connection node A are electrically connected. One of the source and the drain of the seventh transistor T7 is electrically connected to the third voltage terminal Vi. The other of the source and the drain of the seventh transistor T7 is electrically connected to the gate of the second transistor T2.

Further, each additional circuit 502 further includes a sixth transistor T6. One of the source and the drain of the sixth transistor T6 is electrically connected to the second end of the first capacitor C1. The other of the source and the drain of the sixth transistor T6 is electrically connected to one of the source and the drain of the second transistor T2 connected to the gate of the second transistor T2.

The gate driving chip 504 is electrically connected to the plurality of additional circuits 502 through a plurality of scan lines SL. Specifically, in each additional circuit 502, the gate of the fifth transistor T5, the gate of the sixth transistor T6, and the nth scan line that transmits the nth stage scan signal Scan(n) SL(n) is electrically connected. The gate of the seventh transistor T7 is electrically connected to the n−1th scan line SL(n−1) that transmits the n−1th level scan signal Scan(n−1).

The gate driving chip 504 is electrically connected to the plurality of additional circuits 502 through a plurality of scan lines SL. Each of the additional circuits 502 is connected to a different scan line SL, and a plurality of the additional circuits 502 are all located in the display area 500*a*. A driving circuit 501 and an additional circuit 502 are arranged correspondingly, as shown in FIG. 5A. Further, the gate driving chip 504 is electrically connected to the plurality of additional circuits 502 through a plurality of scan lines SL, and the sixth transistor T6 can be omitted.

In practical applications, since the display panel includes a plurality of the driving circuits 501 and a plurality of the additional circuits 502. A plurality of the driving circuits can share the additional circuit 502 to reduce the gate voltage at the connection node A and the first transistor T1 in the driving circuit 501, as shown in FIG. 5B. When a plurality of the additional circuits 502 are located in the non-display area 500*b*, the additional circuits 502 are controlled by multiplexed signals and clock signals.

Specifically, referring to FIGS. 5B and 6C, each additional circuit 502 is connected to a plurality of driving circuits 501 in a corresponding column. The plurality of driving circuits 501 and the correspondingly connected plurality of additional circuits 502 located in the same column are electrically connected to the same first signal line DL. That is, a plurality of the driving circuits 501 located in the same column are electrically connected to one of the additional circuits 502. The additional circuit 502 and the plurality of driving circuits 501 electrically connected are connected to the same first signal line DL, so as to compensate the connection node A of the plurality of driving circuits 501 through an additional circuit 502. In the display panel shown in FIG. 5B, 5011 indicates a driving circuit located in an odd-numbered row, and 5012 indicates a driving circuit located in an even-numbered row.

Further, each of the additional circuits 502 includes a first additional module 5021, a second additional module 5022, and a signal module. The first additional module 5021 is electrically connected to the driving circuit 5011 located in the odd row. The second additional module 5022 is electrically connected to the driving circuit 5012 in the even row. The first additional module 5021 and the second additional module 5022 in each additional circuit 502 are electrically connected to the same first signal line DL.

The first additional module 5021 includes a second odd transistor T21. One of the source and the drain of the second odd transistor T21 is electrically connected to the connection node A of the driving circuit 5011 in the odd row and the gate of the second-odd transistor T21. The threshold voltage of the second-odd transistor T21 is the same as the threshold voltage of the first transistor T1 of the driving circuit 5011 in the odd row.

The second additional module 5022 includes a second-even transistor T22. One of the source and the drain of the second-even transistor T22 is electrically connected to the connection node A of the driving circuit 5012 in an even row and the gate of the second-even transistor T22. The threshold voltage of the second-even transistor T22 is the same as the threshold voltage of the first transistor T1 of the driving circuit 5012 in the even row.

The signal module includes a fifth-odd transistor T51 and a fifth-even transistor T52. The source and the drain of the fifth-odd transistor T51 are electrically connected between one of the source and the drain of the second-odd transistor T21 and the corresponding first signal line DL. The source and the drain of the fifth-even transistor T52 are electrically connected between one of the source and the drain of the second-even transistor T22 and the corresponding first signal line DL. The gate of the fifth-odd transistor T51 is electrically connected to the second signal line. The gate of the fifth-even transistor T52 is electrically connected to the third signal line. One of the second signal line and the third signal line may be a first reset signal line ML1 that transmits a first reset signal MUX1. The other of the second signal line and the third signal line may be a second reset signal line ML2 that transmits a second reset signal MUX2.

Further, the first additional module 5021 further includes a first odd capacitor C11. The first odd capacitor C11 is electrically connected between the first voltage terminal VDD and the gate of the second-odd transistor T21. The second additional module 5022 also includes a first even capacitor C12. The first-even capacitor C12 is electrically connected between the first voltage terminal VDD and the gate of the second-even transistor T22.

Further, the first additional module 5021 further includes a sixth-odd transistor T61. The source and the drain of the sixth-odd transistor T61 are electrically connected between the first sub-switching transistor Ts1 of the driving circuit 5011 in the odd row and one of the source and the drain of the second-odd transistor T21, and are electrically connected between the second sub-switching transistor Ts2 of the driving circuit 5011 in the odd row and one of the source and the drain of the second-odd transistor T21. The second additional module 5022 also includes a sixth-even transistor T62. The source and the drain of the sixth-even transistor T62 are electrically connected between the first sub-switching transistor Ts1 of the driving circuit 5012 in the even row and one of the source and the drain of the second-even transistor T22, and are electrically connected between the second sub-switching transistor Ts2 of the driving circuit 5012 in the even row and one of the source and the drain of the second-even transistor T21.

Further, the first additional module 5021 further includes a seventh-odd transistor T71. The source and the drain of the seventh-odd transistor T71 are electrically connected between the third voltage terminal Vi and the gate of the second-odd transistor T21. The second additional module 5022 also includes a seventh-even transistor T72. The source and the drain of the seventh-even transistor T72 are electrically connected between the third voltage terminal Vi and the gate of the second-even transistor T22.

Please continue to refer to FIG. 5B and FIG. 6C, the display panel further includes a multiplexer. The multiplexer is located in the non-display area 500*b* of the display panel. The multiplexer is electrically connected to the plurality of additional circuits 502 through the first multiplexed signal line ML1 and the second multiplexed signal line ML2. Specifically, the gate of the fifth-odd transistor T51 in the first additional module 5021, the gate of the seventh-even transistor T72 in the second additional module 5022, and the second multiplexed signal line ML2 are electrically connected. The gate of the seventh-odd transistor T71 in the first additional module 5021 and the gate of the fifth-even transistor T52 in the second additional module 5022 are electrically connected to the first multiplexed signal line ML1. Optionally, the gate of the sixth-odd transistor T61 in the first additional module 5021 is electrically connected to the second multiplexed signal line ML2. The gate of the sixth-even transistor T62 in the second additional module 5022 is electrically connected to the first multiplexed signal line ML1.

Further, the display panel further includes a timing controller. The timing controller is located in the non-display area 500*b* of the display panel. The timing controller is electrically connected to the plurality of additional circuits 502 through the first clock signal line CKL1 and the second clock signal line CKL2. Specifically, the gate of the sixth-odd transistor T61 in the first additional module 5021 is electrically connected to the first clock signal line CKL1. The gate of the sixth-even transistor T62 in the second additional module 5022 is electrically connected to the second clock signal line CKL2.

Please continue to refer to FIGS. 5B, 6A, and 6C, the source and the drain of the first sub-switching transistor Ts1 of the driving circuit 5011 in the odd rows are electrically connected between the first sub-connection node A1 of the driving circuit 5011 of the odd-numbered row and the other of the source and the drain of the second odd transistor T21. The source and the drain of the second sub-switching transistor Ts2 of the driving circuit 5011 in the odd-numbered rows are connected between the second sub-connection node A2 of the driving circuit 5011 of the odd-numbered row and the other of the source and the drain of the second-odd transistor T21. The source and the drain of the first sub-switching transistor Ts1 of the driving circuit 5012 of the even-numbered row are connected between the first sub-connection node A1 of the driving circuit 5012 of the even-numbered row and the other of the source and the drain of the second even transistor T22. The source and the drain of the second sub-switching transistor Ts2 of the driving circuit 5012 of the even-numbered row are connected between the second sub-connection node A2 of the driving circuit 5012 of the even-numbered row and the other of the source and the drain of the second-even transistor T22.

Compared with the display panel shown in FIG. 5B, in the display panel shown in FIG. 5A, the plurality of additional circuits 502 are electrically connected to the gate driving chip 504 through a plurality of scan lines SL. This allows a plurality of the additional circuits 502 to be located in the display area 500*a*, which is beneficial for the display panel to realize a narrow frame design. Compared with the display panel shown in FIG. 5A, the display panel shown in FIG. 5B is electrically connected to the multiplexer and the timing controller because a plurality of the additional circuits 502 are electrically connected. This allows a plurality of the additional circuits 502 to be located in the non-display area 500*b*, which is beneficial to save a wiring space in the display area 500*a* of the display panel and reduce the wiring difficulty of the display panel.

Figure 7:
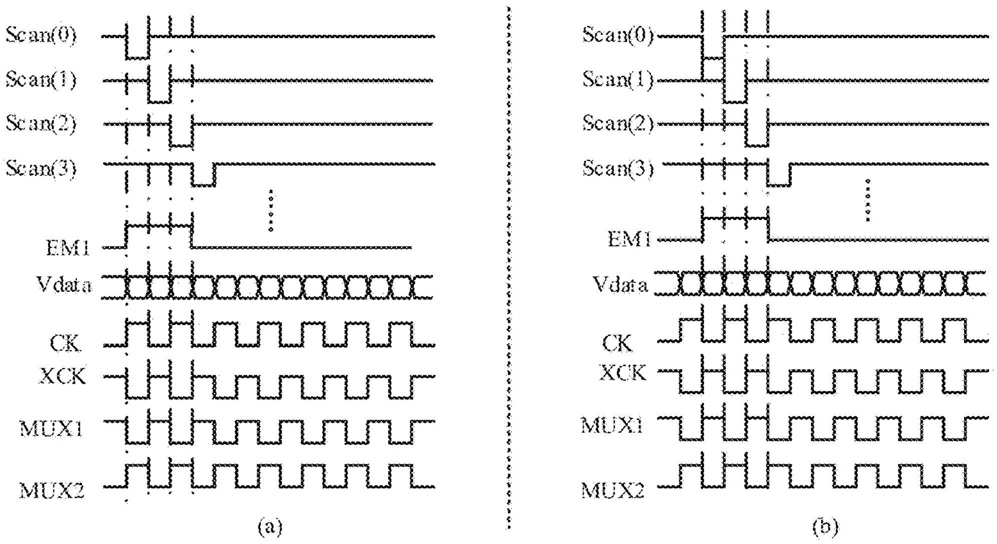
FIG. 7 is a timing diagram corresponding to the display panel shown in FIG. 5B.

FIG. 7 is a timing diagram corresponding to the display panel shown in FIG. 5B provided by an embodiment of the present application. Taking that the transistors included in the driving circuit 501 and the additional circuit 502 are all P-type transistors as an example, the working principle of the display panel shown in FIG. 5B will be described with reference to FIG. 7. The display panel shown in FIG. 5B adopts the driving circuit shown in FIG. 6A and the additional circuit shown in FIG. 6C.

Referring to FIG. 5B and FIG. 7(*a*), when the scan signal Scan(0) is at a low level, the first multiplexed signal MUX1 loaded on the first multiplexed signal line ML1 and the second clock signal XCK loaded on the second clock signal line CKL2 are at the low level. The second multiplexed signal MUX2 loaded on the second multiplexed signal line ML2 and the first clock signal CK loaded on the first clock signal line CKL1 are at a high level. The fourth transistor T4 in the plurality of driving circuits 5011 located in the first row (odd-numbered row) is turned on in response to the scan signal Scan(0). This makes the gate potential of the first transistor T1 reset through the third voltage terminal Vi. The seventh-odd transistor T71 in the first additional module 5021 electrically connected to the plurality of driving circuits 5011 located on the first row is turned on in response to the first multiplexed signal MUX1. This makes the gate potential of the second odd transistor T21 reset through the third voltage terminal Vi.

When the scan signal Scan(1) is at a low level, the second multiplexed signal MUX2 and the first clock signal CK are at a low level. The first multiplexed signal MUX1 and the second clock signal XCK are at a high level. The third transistor T3, the eighth transistor T8, and the eleventh transistor T11 in the plurality of driving circuits 5011 located in the first row are turned on in response to the scan signal Scan(1). The data signal Vdata loaded on the plurality of first signal lines DL is transmitted to the gate of the first transistor T1 through the eighth transistor T8, the first transistor T1, and the third transistor T3 (that is at point B). The second capacitor C2 maintains the gate potential of the first transistor T1 at Vdata-Vth1. (That is, the potential at point B in the driving circuit in the first row and the first column is Vdata1-Vth1. The potential at point B in the driving circuit in the first row and the second column is Vdata2-Vth1. Vdatai represents the data signal loaded on the i-th sub-signal line DLi, i=1, 2, . . . ). The eleventh transistor T11 in the plurality of driving circuits 5011 located in the first row is turned on so that the anode potential of the light-emitting device D1 is reset through the third voltage terminal Vi. The fifth-odd transistor T51 in the first additional module 5021 electrically connected to the plurality of driving circuits 5011 located in the first row is turned on in response to the second multiplexed signal MUX2. The sixth-odd transistor T61 is turned on in response to the first clock signal CK. The data signals Vdata loaded on the plurality of first signal lines DL are transmitted to the second end (that is, at the point Co) of the first odd capacitor C11 through the fifth-odd transistor T51, the second-odd transistor T21, and the sixth-odd transistor T61. The first odd capacitor C11 maintains the potential at the point Co as Vdata-Vth2. (That is, the electric potential at the point Co in the first additional module that is electrically connected to the driving circuit located in the first row and the first column is Vdata1-Vth2. Compared with the electric potential at the point Co in the first row and the second column, the potential at the point Co in the first additional module electrically connected to the driving circuit is Vdata2-Vth2, . . . ).

At the same time, the fourth transistor T4 in the plurality of driving circuits 5012 located in the second row (even-numbered row) is turned on in response to the scan signal Scan(1). This makes the gate potential of the first transistor T1 reset through the third voltage terminal Vi. The seventh-even transistor T72 in the second additional module 5022 electrically connected to the plurality of driving circuits 5012 located in the second row is turned on in response to the second multiplexed signal MUX2. This makes the gate potential of the second even transistor T22 reset through the third voltage terminal Vi.

When the scan signal Scan(2) is at a low level, the second multiplexed signal MUX2 and the first clock signal CK are at a high level. The first multiplexed signal MUX1 and the second clock signal XCK are at a low level. The switching transistors Ts in the plurality of driving circuits 5011 located in the first row are turned on in response to the scan signal Scan(2). The potential at the connection node A becomes Vdata-Vth2 (that is, the potential at the connection node A in the driving circuit in the first row and the first column becomes Vdata1-Vth2. The potential at the first row and the first column becomes Vdata1-Vth2. The potential at the connection node A in the driving circuit of the second column becomes Vdata2-Vth2, . . . ). The seventh-odd transistor T71 in the first additional module 5021 electrically connected to the plurality of driving circuits 5011 located in the first row is turned on in response to the first multiplexed signal MUX1. This makes the gate of the second-odd transistor T21 reset through the third voltage terminal Vi.

At the same time, the third transistor T3, the eighth transistor T8, and the eleventh transistor T11 in the plurality of driving circuits 5012 located in the second row are turned on in response to the scan signal Scan(2). The data signal Vdata loaded by the plurality of first signal lines DL is transmitted to the gate of the first transistor T1 through the eighth transistor T8, the first transistor T1, and the third transistor T3 (that is at point B). The second capacitor C2 maintains the gate potential of the first transistor T1 at Vdata-Vth1. (That is, the potential at point B in the driving circuit in the second row and first column is Vdata1-Vth1. The potential at point B in the driving circuit in the second row and second column is Vdata2-Vth1, . . . ). The eleventh transistor T11 in the plurality of driving circuits 5012 located in the second row is turned on so that the anode potential of the light emitting device D1 is reset through the third voltage terminal Vi. The fifth even transistor T52 in the second additional module 5022 electrically connected to the plurality of driving circuits 5012 located in the second row is turned on in response to the first multiplexed signal MUX1. The sixth-even transistor T62 is turned on in response to the second clock signal XCK. The data signals Vdata loaded by the plurality of first signal lines DL are transmitted to the second end (that is, at the Ce point). of the first even capacitor C12 through the fifth even transistor T52, the second even transistor T22, and the sixth even transistor T62. The first even capacitor C12 maintains the potential at the point Ce at Vdata-Vth2. (That is, the electric potential at the point Ce in the second additional module electrically connected to the driving circuit in the second row and the first column is Vdata1-Vth2. Compared with the electric potential at the point Ce in the second row and the second column, the electric potential at the Ce point in the second additional module electrically connected to the driving circuit is Vdata2-Vth2, . . . ).

At the same time, the fourth transistor T4 in the plurality of driving circuits 5011 located in the third row (odd-numbered row) is turned on in response to the scan signal Scan(2). This makes the gate potential of the first transistor T1 reset through the third voltage terminal Vi. The seventh-odd transistor T71 in the first additional module 5021 electrically connected to the plurality of driving circuits 5011 located in the third row is turned on in response to the first multiplexed signal MUX1. This makes the gate of the second-odd transistor T21 reset through the third voltage terminal Vi. It is understandable that the first additional module 5021 is only electrically connected to the driving circuits in odd rows. Therefore, the first additional module 5021 electrically connected to the plurality of driving circuits located in the third row is the first additional module 5021 electrically connected to the plurality of driving circuits located in the third row.

When the emission control signal EM1 is at a low level, the ninth transistor T9 and the tenth transistor T10 in the plurality of driving circuits 5011 located in the first row are turned on in response to the emission control signal EM1, and the first A transistor T1 generates a driving current to drive the light emitting device D1 to emit light.

By analogy, it can also be obtained that when the remaining scan signals such as Scan(3) are at a low level, the working principle corresponding to the display panel will not be repeated here.

By analyzing the working principle of the display panel shown in FIG. 5B, it can be known that the time when the first clock signal CK and the second multiplexed signal MUX2 are valid corresponds the time when the driving circuit 5011 of the odd-numbered row receives the data signal Vdata transmitted by the first signal line DL. The time when the second clock signal XCK and the first multiplexed signal MUX1 are valid corresponds to the time when the driving circuit 5012 of the even row receives the data signal Vdata transmitted by the first signal line DL.

In addition, the gate of the fifth-odd transistor T51 in the first additional module 5021 and the gate of the seventh-even transistor T72 in the second additional module 5022 can also be electrically connected to the first multiplexed signal line ML1. The gate of the seventh-odd transistor T71 in the first additional module 5021 and the gate of the fifth-even transistor T52 in the second additional module 5022 can also be electrically connected to the second multiplexed signal line ML2. Correspondingly, the gate of the sixth-odd transistor T61 in the first additional module 5021 is electrically connected to the second clock signal line CKL2. The gate of the sixth-even transistor T62 in the second additional module 5022 is electrically connected to the first clock signal line CKL1. The corresponding control sequence is shown in FIG. 7(*b*). At this time, the time when the first clock signal CK and the second multiplexed signal MUX2 are valid corresponds to the time when the driving circuit of the even row receives the data signal Vdata transmitted by the first signal line DL. The time when the second clock signal XCK and the first multiplexed signal MUX1 are valid corresponds to the time when the driving circuit of the odd-numbered row receives the data signal Vdata transmitted by the first signal line DL.

Optionally, the gate of the fifth-odd transistor T51, the gate of the fifth-even transistor T52, the gate of the seventh-odd transistor T71, and the gate of the seventh-even transistor T72 are all electrically connected to the first multiplexed signal line ML1. The gate of the sixth-odd transistor T61 and the gate of the sixth-even transistor T62 are both electrically connected to the first multiplexed signal line ML1 or both are electrically connected to the second clock signal line CKL2. At this time, the fifth-odd transistor T51, the sixth-odd transistor T61, and the seventh-even transistor T72 are N-type transistors. The fifth-even transistor T52, the sixth-even transistor T62, and the seventh-odd transistor T71 are P-type transistors to reduce the number of multiplexed signal lines used by the display panel. The timings of the first multiplexed signal MUX1 loaded on the first multiplexed signal line ML1 and the second clock signal XCK loaded on the second clock signal line CKL2 are shown in FIG. 7(*a*).

Optionally, the gate of the fifth-odd transistor T51, the gate of the fifth-even transistor T52, the gate of the seventh-odd transistor T71, and the gate of the seventh-even transistor T72 are all electrically connected to the second multiplexed signal line ML2. The gate of the sixth-odd transistor T61 and the gate of the sixth-even transistor T62 are both electrically connected to the second multiplexed signal line ML2 or both are electrically connected to the first clock signal line CKL1. At this time, the fifth-odd transistor T51, the sixth-odd transistor T61, and the seventh-even transistor T72 are N-type transistors. The fifth-even transistor T52, the sixth-even transistor T62, and the seventh-odd transistor T71 are P-type transistors to reduce the number of multiplexed signal lines used by the display panel. The timings of the second multiplexed signal MUX2 loaded on the second multiplexed signal line ML2 and the first clock signal CK loaded on the first clock signal line CKL1 are shown in FIG. 7(*b*).

Optionally, a plurality of the driving circuits 501 located in the same column in the display panel shown in FIG. 5B are electrically connected to an additional circuit 502. However, in practical applications, the plurality of driving circuits 501 located in the same column may also be electrically connected to the plurality of additional circuits 502. (For example, among the plurality of drive circuits located in the same column, the driving circuit located in the first row and the driving circuit located in the second row are electrically connected to the same additional circuit. The first additional module of the additional circuit is electrically connected to the driving circuit of the first row. The second additional module of the additional circuit is electrically connected to the driving circuit of the second row. The driving circuit located in the third row and the driving circuit located in the fourth row are electrically connected to the same additional circuit. The first additional module of the additional circuit is electrically connected to the driving circuit of the third row. The second additional module of the additional circuit is electrically connected to the driving circuit of the fourth row connect, . . . ) A plurality of the additional circuits 502 are still located in the non-display area 500*b*.

Figure 1B:
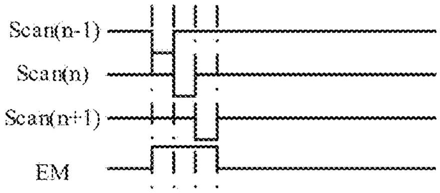
Figure 8:
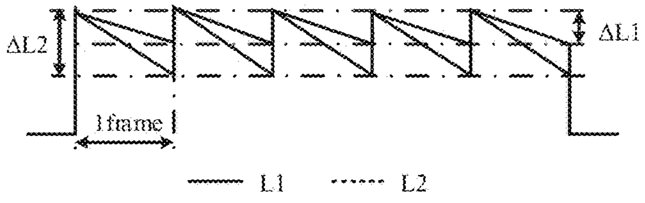
FIG. 8 is an expected effect diagram of a brightness measurement of a display panel provided by an embodiment of the present application.

FIG. 8 is a diagram of the expected effect of the brightness measurement of the display panel provided by the embodiment of the present application. L1 represents the expected effect curve of the brightness measurement obtained by this application. L2 represents the expected effect curve of brightness measurement obtained by adopting the existing design shown in FIG. 1A to FIG. 1B. ΔL1 and ΔL2 represent the amount of change in brightness in one frame. Compared with the existing designs shown in FIGS. 1A to 1B, the potential difference between the connection node A and the gate of the first transistor T1 in the driving circuit of the present application is smaller, and the resulting ΔL1 is even smaller. That is, the source-drain voltage difference of the first sub-connecting transistor Tc1 is reduced. This further reduces the leakage current of the first sub-connecting transistor Tc1, and finally reduces the amount of change in the gate potential of the first transistor T1 within a frame time.

The present application also provides a display device, which includes any of the above-mentioned driving circuits or any of the above-mentioned display panels.

Understandably, the display device includes a movable display device (such as a notebook computer, a mobile phone, etc.), a fixed terminal (such as a desktop computer, a TV, etc.), a measuring device (such as a sports bracelet, a thermometer, etc.), and the like.

Specific examples are used in this article to illustrate the principles and implementation of the application. The description of the above examples is only used to help understand the method and core ideas of the application. At the same time, for those skilled in the art, according to the idea of this application, there will be changes in the specific implementation and the scope of application. In summary, the content of this specification should not be construed as a limitation on this application.

What is claimed is:

1. A driving circuit, comprising:

a driving module comprising a light-emitting device, a first transistor, and a connection transistor, wherein the light-emitting device and the first transistor are connected in series between a first voltage terminal and a second voltage terminal, and one of a source and a drain of the first transistor is electrically connected to a first signal line; the connection transistor comprises a first sub-connection transistor and a second sub-connection transistor connected in series, the first sub-connection transistor and the second sub-connection transistor have a connection node, one of a source and a drain of the first sub-connection transistor is electrically connected to a gate of the first transistor, and a gate of the first sub-connection transistor and a gate of the second sub-connection transistor are electrically connected; and an additional module comprising a second transistor, wherein one of a source and a drain of the second transistor is electrically connected to the first signal line, and the other of the source and the drain of the second transistor is electrically connected to the connection node and a gate of the second transistor, and a threshold voltage of the second transistor is the same as a threshold voltage of the first transistor.

2. The driving circuit according to claim 1, wherein the connection transistor comprises a third transistor, the third transistor comprises a third sub-connection transistor and a fourth sub-connection transistor connected in series, and the third sub-connection transistor and the fourth sub-connection transistor have a first sub-connection node; wherein the first sub-connection transistor comprises the third sub-connection transistor, the second sub-connection transistor comprises the fourth sub-connection transistor, and the connection node comprises the first sub-connection node, a source and a drain of the third sub-connection transistor are electrically connected between a gate of the first transistor and the first sub-connection node, a source and a drain of the fourth sub-connection transistor are electrically connected between the first sub-connection node and one of the source and the drain of the first transistor, and a gate of the third sub-connection transistor and a gate of the fourth sub-connection transistor are electrically connected.

3. The driving circuit according to claim 2, wherein the connection transistor further comprises a fourth transistor comprising a fifth sub-connection transistor and a sixth sub-connection transistor connected in series, the fifth sub-connection transistor and the sixth-connection transistor have a second sub-connection node; wherein the first sub-connection transistor comprises the fifth sub-connection transistor, the second sub-connection transistor comprises the sixth sub-connection transistor, the connection node comprises the second sub-connection node, a source and a drain of the fifth sub-connection transistor are electrically connected between the gate of the first transistor and the second sub-connection node, a source and a drain of the sixth sub-connection transistor are electrically connected between the second sub-connection node and a third voltage terminal, and a gate of the fifth sub-connection transistor and a gate of the sixth sub-connection transistor are electrically connected.

4. The driving circuit according to claim 3, wherein the additional module further comprises a fifth transistor, a source and a drain of the fifth transistor are electrically connected between the first signal line and one of the source and the drain of the second transistor.

5. The driving circuit according to claim 4, wherein the additional module further comprises a first capacitor electrically connected between the first voltage terminal and the source and the drain of the second transistor.

6. The driving circuit according to claim 5, further comprising a switching transistor comprising a first sub-switching transistor and a second sub-switching transistor, wherein a source and a drain of the first sub-switching transistor are connected between the first sub-connection node and another of the source of and the drain of the second transistor, and a source and a drain of the second sub-switching transistor are connected between the second sub-connection node and another of the source of and the drain of the second transistor.

7. The driving circuit according to claim 6, wherein the additional module further comprises a sixth transistor, a source and a drain of the sixth transistor are electrically connected between the first sub-switching transistor and another of the source and the drain of the second transistor, and are electrically connected between the second sub-switching transistor and another of the source and the drain of the second transistor.

8. The driving circuit according to claim 3, wherein the additional module further comprises a seventh transistor, a source and a drain of the seventh transistor are electrically connected between a third voltage terminal and the gate of the second transistor.

9. The driving circuit according to claim 4, wherein the driving module further comprises a second capacitor connected in series between the first voltage terminal and the gate of the first transistor.

10. A display panel comprising a driving circuit, wherein the driving circuit comprises:

a driving module comprising a light-emitting device, a first transistor, and a connection transistor, wherein the light-emitting device and the first transistor are connected in series between a first voltage terminal and a second voltage terminal, and one of a source and a drain of the first transistor is electrically connected to a first signal line; the connection transistor comprises a first sub-connection transistor and a second sub-connection transistor connected in series, the first sub-connection transistor and the second sub-connection transistor have a connection node, one of a source and a drain of the first sub-connection transistor is electrically connected to a gate of the first transistor, and a gate of the first sub-connection transistor and a gate of the second sub-connection transistor are electrically connected; and an additional module comprising a second transistor, wherein one of a source and a drain of the second transistor is electrically connected to the first signal line, and the other of the source and the drain of the second transistor is electrically connected to the connection node and a gate of the second transistor, and a threshold voltage of the second transistor is the same as a threshold voltage of the first transistor.

11. The display panel according to claim 10, wherein the additional module is located at a display area or a non-display area of the display panel.

12. The display panel according to claim 10, further comprising a switching transistor, wherein the additional module further comprises a fifth transistor, a first capacitor, and a seventh transistor;

wherein the switching transistor is electrically connected between the connection node and the other of the source and the drain of the second transistor;

wherein a source and a drain of the fifth transistor are connected between the first signal line and one of the source and the drain of the second transistor;

wherein the first capacity is electrically connected between the first voltage terminal and the source and the drain of the second transistor; and wherein the source and the drain of the seventh transistor are electrically connected between a third voltage terminal and the gate of the second transistor.

13. A display panel, comprising:

a plurality of driving circuits arranged by array, wherein each of the driving circuits comprises a driving module, the driving module comprises a light-emitting device, a first transistor, and a connection transistor, wherein the light-emitting device and the first transistor are connected in series between a first voltage terminal and a second voltage terminal, and one of a source and a drain of the first transistor is electrically connected to a first signal line; the connection transistor comprises a first sub-connection transistor and a second sub-connection transistor connected in series, the first sub-connection transistor and the second sub-connection transistor have a connection node, one of a source and a drain of the first sub-connection transistor is electrically connected to a gate of the first transistor, and a gate of the first sub-connection transistor and a gate of the second sub-connection transistor are electrically connected; and a plurality of additional modules, wherein each of the additional circuits is electrically connected to the plurality of drive circuits corresponding to a column, each of the additional circuits comprises a first additional module, a second additional module, and a signal module;

wherein the first additional module comprises a second odd-transistor, one of a source and a drain of the second odd-transistor is electrically connected to the connection node of the driving circuit in an odd row and a gate of the second odd-transistor, and a threshold voltage of the second odd-transistor is the same as a threshold voltage of the first transistor of the driving circuit in the odd row;

wherein the second additional module comprises a second even-transistor, one of a source and a drain of the second even-transistor is electrically connected to the connection node of the driving circuit in an even row and a gate of the second even-transistor, and a threshold voltage of the second even-transistor is the same as a threshold voltage of the first transistor of the driving circuit in the even row; and wherein the signal module comprises a fifth-odd-transistor and a fifth-even-transistor, a source and a drain of the fifth-odd-transistor are electrically between one of the source and the drain of the second odd-transistor and the first signal line, a source and a drain of the fifth even-transistor are electrically connected between one of the source and the drain of the second even-transistor and the first signal line, a gate of the fifth odd-transistor is electrically connected to a second signal line, and the gate of the fifth even-transistor is electrically connected to a third signal line.

14. The display panel according to claim 13, wherein the connection transistor comprises a third transistor and a fourth transistor, the third transistor comprises a third sub-connection transistor and a fourth sub-connection transistor connected in series, the third sub-connection transistor and the fourth sub-connection transistor have a first sub-connection node, the fourth transistor comprises a fifth sub-connection transistor and a sixth sub-connection transistor connected in series, and the fifth sub-connection transistor and the sixth sub-connection transistor have a second sub-connection node;

wherein the first sub-connection transistor comprises the third sub-connection transistor and the fifth sub-connection transistor, the second sub-connection transistor comprises the fourth sub-connection transistor and the sixth sub-connection transistor, the connection node comprises the first sub-connection node and the second sub-connection node; a source and a drain of the third sub-connection transistor are electrically connected between the gate of the first transistor and the first sub-connection node, a source and a drain of the fourth sub-connection transistor are electrically connected between the first sub-connection node and the other of the source and the drain of the first transistor, and the gate of the third sub-connection transistor and the gate of the fourth sub-connection transistor are electrically connected; a source and a drain of the fifth sub-connection transistor are electrically connected between the gate of the first transistor and the second sub-connection node, a source and a drain of the sixth sub-connection transistor are electrically connected between the second sub-connection node and a third voltage terminal, and a gate of the fifth sub-connection transistor and a gate of the sixth sub-connection transistor are electrically connected.

15. The display panel according to claim 14, wherein each of the driving circuits further comprises a switching module, and the switching module comprises a first sub-switching transistor and a second sub-switching transistor; wherein a source and a drain of the first sub-switching transistor of the driving circuit in the odd row are electrically connected between the first sub-connection node of the driving circuit in the odd row and another of the source and the drain of the second-odd-transistor, a source and a drain of the second sub-switching transistor of the driving circuit in the odd row are electrically connected between the second sub-connection node of the driving circuit in the odd row and another of the source and the drain of the second-odd-transistor; a source and a drain of the first sub-switching transistor of the driving circuit in the even row are electrically connected between the first sub-connection node of the driving circuit in the even row and another of the source and the drain of the second-even-transistor, a source and a drain of the second sub-switching transistor of the driving circuit in the even row are electrically connected between the second sub-connection node of the driving circuit in the even row and another of the source and the drain of the second-even-transistor.

16. The display panel according to claim 15, wherein the first additional module further comprises a first odd capacitor, and the first odd capacitor is electrically connected between the first voltage terminal and the gate of the second odd-transistor; the second additional module further comprises a first even capacitor, and the first even capacitor is electrically connected between the first voltage terminal and the gate of the second even-transistor.

17. The display panel according to claim 16, wherein the first additional module further comprises a sixth-odd transistor, a source and a drain of the sixth-odd transistor are electrically connected between the first sub-switching transistor of the driving circuit in the odd row and another of the source and the drain of the second-odd transistor, and are electrically connected between the second sub-switching transistor of the driving circuit in the odd row and another of the source and the drain of the second-odd transistor; the second additional module further comprises a sixth-even transistor, a source and a drain of the sixth-even transistor are electrically connected between the first sub-switching transistor of the driving circuit in the even row and another of the source and the drain of the second-even transistor, and are electrically connected between the second sub-switching transistor of the driving circuit in the even row and another of the source and the drain of the second-even transistor.

18. The display panel according to claim 14, wherein the first additional module further comprises a seventh-odd transistor, and a source and a drain of the seventh-odd transistor are electrically connected between the third voltage terminal and the gate of the second-odd transistor; the second additional module further comprises a seventh-even transistor, a source and a drain of the seventh-even transistor are electrically connected between the third voltage terminal and the gate of the second-even transistor.

19. The display panel according to claim 15, wherein each of the driving circuits further comprises a second capacitor connected in series between the first voltage terminal and the gate of the first transistor.

20. The display panel according to claim 13, wherein a plurality of the additional circuits are located in a non-display area of the display panel.

* * * * *